United States Patent
Raghavan et al.

(10) Patent No.: US 12,395,214 B2
(45) Date of Patent: Aug. 19, 2025

(54) SWITCHING TO AN ADAPTIVE BEAM WEIGHT-BASED HYBRID BEAMFORMING PROCEDURE

(71) Applicant: QUALCOMM Incorporated, San Diego, CA (US)

(72) Inventors: Vasanthan Raghavan, West Windsor Township, NJ (US); Tao Luo, San Diego, CA (US); Danlu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 429 days.

(21) Appl. No.: 17/880,482

(22) Filed: Aug. 3, 2022

(65) Prior Publication Data
US 2024/0048198 A1 Feb. 8, 2024

(51) Int. Cl.
| H04B 7/06 | (2006.01) |
| H04B 7/08 | (2006.01) |
| H04L 5/00 | (2006.01) |

(52) U.S. Cl.
CPC ........... *H04B 7/0617* (2013.01); *H04B 7/088* (2013.01); *H04L 5/0051* (2013.01)

(58) Field of Classification Search
CPC .... H04B 7/0617; H04B 7/088; H04B 7/0456; H04L 5/0051
See application file for complete search history.

(56) References Cited

U.S. PATENT DOCUMENTS

| 10,505,616 | B1 * | 12/2019 | Chen | H04B 17/318 |
| 10,879,991 | B2 * | 12/2020 | Zhou | H04B 7/0877 |
| 11,336,319 | B2 * | 5/2022 | Badic | H04W 72/51 |

(Continued)

FOREIGN PATENT DOCUMENTS

| CN | 106797640 B | * 6/2020 | H04W 72/046 |
| CN | 115001550 A | * 9/2022 | H04B 7/0452 |

(Continued)

OTHER PUBLICATIONS

International Search Report and Written Opinion—PCT/US2023/070861—ISA/EPO—Oct. 31, 2023.

*Primary Examiner* — Sujoy K Kundu
*Assistant Examiner* — Vladislav Y Agureyev
(74) *Attorney, Agent, or Firm* — Holland & Hart LLP/QUALCOMM Incorporated

(57) ABSTRACT

Methods, systems, and devices for wireless communications are described. In some systems, a user equipment (UE) may detect a material proximate to the UE and may determine one or more properties of the material which may affect beamformed communications. The UE may transmit (e.g., based on the detected material) an indication of a switch from a codebook-based hybrid beamforming procedure to an adaptive beam weight-based hybrid beamforming procedure. The UE may receive, from a network entity, one or more reference signals to use for adaptive beam weight selection in response to the indication of the switch to the adaptive beam weight-based hybrid beamforming procedure. The UE may communicate, with the network entity, in accordance with one or more beam weights selected based on the adaptive beam weight-based hybrid beamforming procedure and the one or more reference signals.

25 Claims, 18 Drawing Sheets

(56) References Cited

U.S. PATENT DOCUMENTS

| | | | |
|---|---|---|---|
| 11,637,613 B1* | 4/2023 | Learned | H04J 11/0036 369/44.28 |
| 11,658,712 B1 | 5/2023 | Musgrove | H04B 7/0617 375/267 |
| 2016/0127088 A1* | 5/2016 | Lou | H04B 7/0617 370/330 |
| 2016/0337007 A1* | 11/2016 | Seyedmehdi | H04B 7/0413 |
| 2016/0337916 A1* | 11/2016 | Deenoo | H04W 8/22 |
| 2016/0359533 A1* | 12/2016 | Obara | H04B 7/0408 |
| 2018/0003693 A1* | 1/2018 | Pelini | B29C 67/249 |
| 2018/0063693 A1* | 3/2018 | Chakraborty | H04W 8/005 |
| 2018/0269946 A1* | 9/2018 | Choi | H04W 24/08 |
| 2018/0367355 A1* | 12/2018 | Pan | H04L 27/2607 |
| 2019/0199569 A1* | 6/2019 | Bala | H04L 27/2627 |
| 2019/0253112 A1* | 8/2019 | Raghavan | H04B 7/0695 |
| 2019/0296821 A1* | 9/2019 | Choi | H04B 7/00 |
| 2020/0213054 A1* | 7/2020 | Park | H04B 7/0639 |
| 2020/0295822 A1* | 9/2020 | Dankberg | H04B 7/18515 |
| 2020/0389852 A1* | 12/2020 | Wang | H04W 72/046 |
| 2021/0083750 A1* | 3/2021 | Mohiuddin | H04B 7/0639 |
| 2021/0160851 A1* | 5/2021 | Akkarakaran | H04W 76/14 |
| 2021/0195436 A1* | 6/2021 | Hong | H04W 16/28 |
| 2021/0281311 A1* | 9/2021 | Zhang | H04B 17/318 |
| 2021/0351960 A1* | 11/2021 | Huang | H04L 5/0094 |
| 2022/0021420 A1* | 1/2022 | Liu | H04B 7/0413 |
| 2023/0043847 A1* | 2/2023 | Haustein | H04B 7/06966 |
| 2023/0344474 A1* | 10/2023 | Akoum | H04L 5/0064 |
| 2024/0064649 A1* | 2/2024 | Go | H04W 52/262 |
| 2024/0204830 A1* | 6/2024 | Pjanic | H04L 25/03891 |

FOREIGN PATENT DOCUMENTS

| | | | | |
|---|---|---|---|---|
| CN | 115516978 A | * | 12/2022 | H04B 7/024 |
| CN | 117016036 A | * | 11/2023 | H04L 5/0048 |
| EP | 3480966 B1 | * | 5/2021 | H04B 7/0404 |
| WO | WO-2016086144 A1 | * | 6/2016 | H04B 7/0617 |
| WO | WO-2019153224 A1 | | 8/2019 | |
| WO | WO-2020101757 A1 | * | 5/2020 | H04B 7/0404 |
| WO | WO-2020197658 A1 | * | 10/2020 | H04B 7/0417 |
| WO | WO-2023164797 A1 | * | 9/2023 | H04B 7/024 |

* cited by examiner

SWITCHING TO AN ADAPTIVE BEAM WEIGHT-BASED HYBRID BEAMFORMING PROCEDURE

FIELD OF TECHNOLOGY

The following relates to wireless communications, and more specifically to techniques for managing beamforming procedures.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

A method for wireless communications at a UE is described. The method may include transmitting an indication of a switch from a codebook-based hybrid beamforming procedure to an adaptive beam weight-based hybrid beamforming procedure, receiving one or more reference signals in response to the indication of the switch to the adaptive beam weight-based hybrid beamforming procedure, and communicating in accordance with one or more beam weights selected based on the adaptive beam weight-based hybrid beamforming procedure and the one or more reference signals.

An apparatus for wireless communications at a UE is described. The apparatus may include a processor and memory coupled with the processor. The processor may be configured to transmit an indication of a switch from a codebook-based hybrid beamforming procedure to an adaptive beam weight-based hybrid beamforming procedure, receive one or more reference signals in response to the indication of the switch to the adaptive beam weight-based hybrid beamforming procedure, and communicate in accordance with one or more beam weights selected based on the adaptive beam weight-based hybrid beamforming procedure and the one or more reference signals.

Another apparatus for wireless communications at a UE is described. The apparatus may include means for transmitting an indication of a switch from a codebook-based hybrid beamforming procedure to an adaptive beam weight-based hybrid beamforming procedure, means for receiving one or more reference signals in response to the indication of the switch to the adaptive beam weight-based hybrid beamforming procedure, and means for communicating in accordance with one or more beam weights selected based on the adaptive beam weight-based hybrid beamforming procedure and the one or more reference signals.

A non-transitory computer-readable medium storing code for wireless communications at a UE is described. The code may include instructions executable by a processor to transmit an indication of a switch from a codebook-based hybrid beamforming procedure to an adaptive beam weight-based hybrid beamforming procedure, receive one or more reference signals in response to the indication of the switch to the adaptive beam weight-based hybrid beamforming procedure, and communicate in accordance with one or more beam weights selected based on the adaptive beam weight-based hybrid beamforming procedure and the one or more reference signals.

Some examples of the method, apparatuses, and non-transitory computer-readable medium described herein may further include operations, features, means, or instructions for receiving, in response to the indication of the switch to the adaptive beam weight-based hybrid beamforming procedure, a control signal that allocates one or more resources for the one or more reference signals, where the one or more reference signals may be received based on the control signal.

In some examples of the method, apparatuses, and non-transitory computer-readable medium described herein, receiving the one or more reference signals may include operations, features, means, or instructions for receiving one or more channel state information reference signals (CSI-RSs), one or more sounding reference signals (SRSs), or a combination thereof for beam weight estimation and selection.

Some examples of the method, apparatuses, and non-transitory computer-readable medium described herein may further include operations, features, means, or instructions for dynamically performing beam weight estimation based on the one or more reference signals, where the one or more beam weights may be based on the beam weight estimation.

Some examples of the method, apparatuses, and non-transitory computer-readable medium described herein may further include operations, features, means, or instructions for detecting a dielectric property, a conductivity property, or both for a material within a threshold distance from the UE and communicating using the adaptive beam weight-based hybrid beamforming procedure based on the detected dielectric property, the detected conductivity property, or both.

Some examples of the method, apparatuses, and non-transitory computer-readable medium described herein may further include operations, features, means, or instructions for classifying the material with a material type from a set of multiple material types based on the detected dielectric property, the detected conductivity property, or both, where communicating using the adaptive beam weight-based hybrid beamforming procedure may be based on the material type.

Some examples of the method, apparatuses, and non-transitory computer-readable medium described herein may further include operations, features, means, or instructions for receiving assistance information that indicates the set of multiple material types for classification, where the material may be classified with the material type based on the assistance information.

Some examples of the method, apparatuses, and non-transitory computer-readable medium described herein may further include operations, features, means, or instructions for transmitting a radar waveform and receiving, in response to the radar waveform, a reflection of the radar waveform from the material within the threshold distance from the UE, where communicating using the adaptive beam weight-based hybrid beamforming procedure may be based on a distortion metric of the reflection of the radar waveform that satisfies a distortion threshold.

Some examples of the method, apparatuses, and non-transitory computer-readable medium described herein may further include operations, features, means, or instructions for inputting one or more waveform parameters of the reflection of the radar waveform into a machine learning model, where the one or more waveform parameters include at least the distortion metric. Some examples of the method, apparatuses, and non-transitory computer-readable medium described herein may further include operations, features, means, or instructions for classifying the material with a material type in accordance with an output of the machine learning model based on the one or more waveform parameters input into the machine learning model.

Some examples of the method, apparatuses, and non-transitory computer-readable medium described herein may further include operations, features, means, or instructions for detecting a second material property for a second material within the threshold distance from the UE, communicating using the codebook-based hybrid beamforming procedure based on the second material property for the second material, and selecting a codebook from a set of multiple codebooks based on the codebook-based hybrid beamforming procedure and the second material property for the second material.

In some examples of the method, apparatuses, and non-transitory computer-readable medium described herein, the set of multiple codebooks indicates different quantities of beam weights, different beam properties, different phase quantization for the beam weights, different amplitude quantization for the beam weights, or any combination thereof.

A method for wireless communications is described. The method may include obtaining an indication of a switch from a codebook-based hybrid beamforming procedure to an adaptive beam weight-based hybrid beamforming procedure for a UE, outputting, in response to the indication of the switch to the adaptive beam weight-based hybrid beamforming procedure for the UE, a control signal that allocates one or more resources for one or more reference signals, and outputting the one or more reference signals associated with the adaptive beam weight-based hybrid beamforming procedure for the UE via the one or more resources based on the control signal.

An apparatus for wireless communications is described. The apparatus may include a processor and memory coupled with the processor. The processor may be configured to obtain an indication of a switch from a codebook-based hybrid beamforming procedure to an adaptive beam weight-based hybrid beamforming procedure for a UE, output, in response to the indication of the switch to the adaptive beam weight-based hybrid beamforming procedure for the UE, a control signal that allocates one or more resources for one or more reference signals, and output the one or more reference signals associated with the adaptive beam weight-based hybrid beamforming procedure for the UE via the one or more resources based on the control signal.

Another apparatus for wireless communications is described. The apparatus may include means for obtaining an indication of a switch from a codebook-based hybrid beamforming procedure to an adaptive beam weight-based hybrid beamforming procedure for a UE, means for outputting, in response to the indication of the switch to the adaptive beam weight-based hybrid beamforming procedure for the UE, a control signal that allocates one or more resources for one or more reference signals, and means for outputting the one or more reference signals associated with the adaptive beam weight-based hybrid beamforming procedure for the UE via the one or more resources based on the control signal.

A non-transitory computer-readable medium storing code for wireless communications is described. The code may include instructions executable by a processor to obtain an indication of a switch from a codebook-based hybrid beamforming procedure to an adaptive beam weight-based hybrid beamforming procedure for a UE, output, in response to the indication of the switch to the adaptive beam weight-based hybrid beamforming procedure for the UE, a control signal that allocates one or more resources for one or more reference signals, and output the one or more reference signals associated with the adaptive beam weight-based hybrid beamforming procedure for the UE via the one or more resources based on the control signal.

Some examples of the method, apparatuses, and non-transitory computer-readable medium described herein may further include operations, features, means, or instructions for outputting assistance information that indicates a set of multiple material types for classification, where the indication of the switch to the adaptive beam weight-based hybrid beamforming procedure for the UE may be based on the set of multiple material types for classification.

Some examples of the method, apparatuses, and non-transitory computer-readable medium described herein may further include operations, features, means, or instructions for obtaining or outputting one or more communications based on the one or more reference signals associated with the adaptive beam weight-based hybrid beamforming procedure for the UE.

In some examples of the method, apparatuses, and non-transitory computer-readable medium described herein, outputting the one or more reference signals may include operations, features, means, or instructions for outputting one or more CSI-RSs, one or more SRSs, or a combination thereof for beam weight estimation and selection.

DETAILED DESCRIPTION

Figure 1:
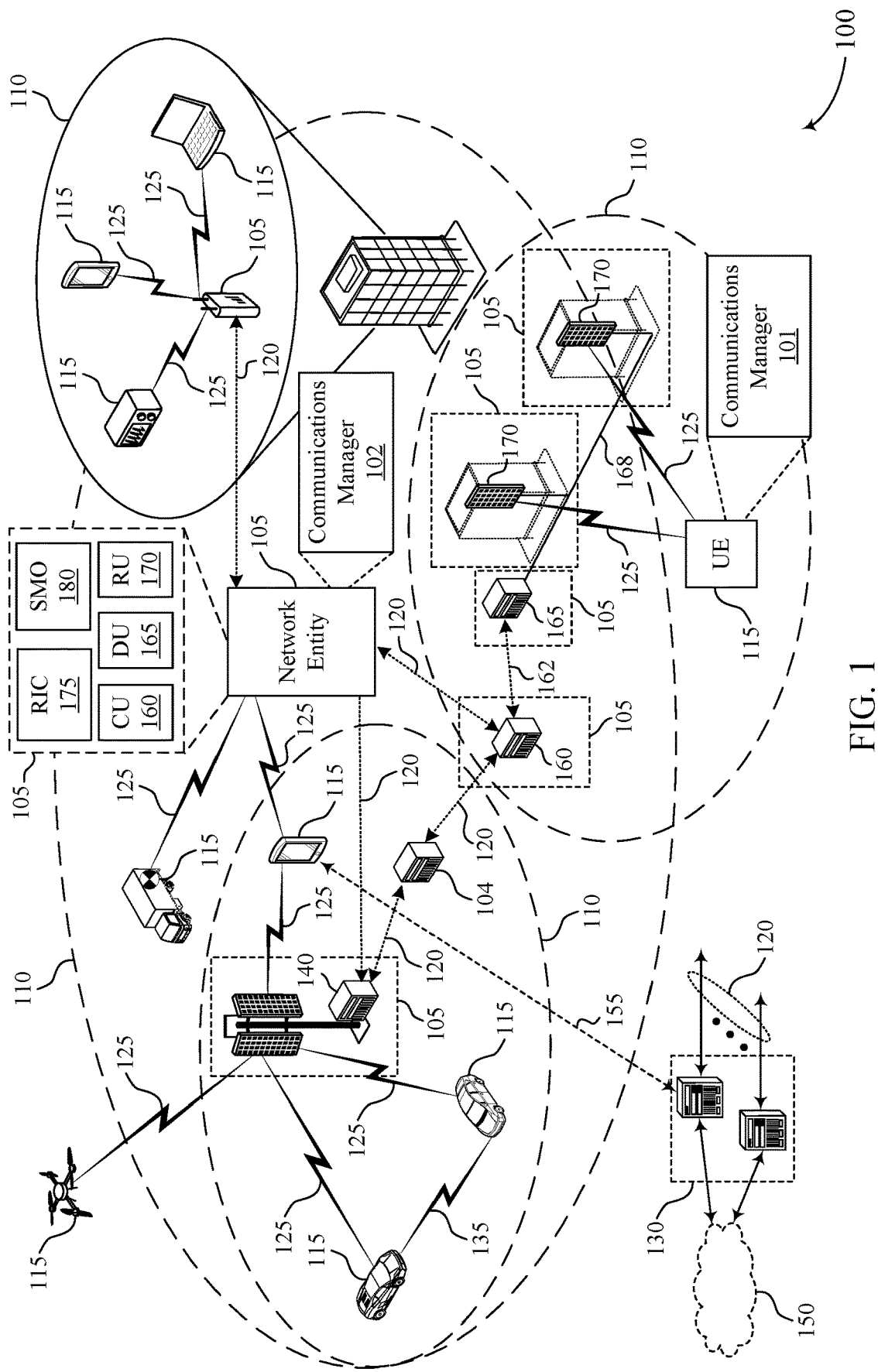
FIG. 1 illustrates an example of a wireless communications system that supports switching to an adaptive beam weight-based hybrid beamforming procedure in accordance with one or more aspects of the present disclosure.

A wireless communications system may include a device, such as a UE or a network entity (e.g., an eNodeB (eNB), a next-generation NodeB or a giga-NodeB, either of which may be referred to as a gNB, or some other base station or network entity), that supports wireless communications using one or multiple radio access technologies. Examples of radio access technologies include 4G systems, such as LTE systems, 5G systems, which may be referred to as NR systems, or other systems and radio technologies, including future systems and radio technologies not explicitly mentioned herein (e.g., sixth generation (6G) systems). In the wireless communications system, a UE may be surrounded by—or located near—a material. For example, the UE (e.g., a mobile phone) may be positioned in a user's hand or may be lying on a table. Different materials may have different material properties, such as reflectivity, conductivity, permissivity, or other associated dielectric properties. Due to the different dielectric properties of different materials, a UE may experience different effective array gain responses for beamformed communications based on the UE being located near different types of materials. Accordingly, the performance of beamformed communications at the UE may change based on the materials near or around the UE.

The UE may detect one or more materials proximate to the UE and may perform beamforming operations in order to select at least some beam parameters (e.g., beam weights, beam properties, phase quantization for the beam weights, amplitude quantization for the beam weights) for communications with other UEs or a network entity. In some cases, the UE may perform such beamforming operations in accordance with a codebook-based hybrid beamforming procedure or an adaptive beam weight-based hybrid beamforming procedure. As described herein, the codebook-based hybrid beamforming procedure may refer to a beamforming process involving a static codebook, and the adaptive beam weight-based hybrid beamforming procedure may refer to a dynamic beam weight selection. If the UE performs beamforming according to the codebook-based hybrid beamforming procedure, the UE may select beam weights to be used for beamforming from a configured (e.g., a priori) set of possible values defined for the codebook. If the UE performs beamforming communications according to the adaptive beam weight-based hybrid beamforming procedure, the UE may receive one or more reference signals to learn beam weights via a machine learning process, such that the UE may train a machine learning algorithm to select more optimal beam weights (e.g., supporting additional beam weight values beyond a configured set for a codebook). The UE may support additional flexibility in beamforming operations and relatively more beam weight options for communications by using the adaptive beam weight-based hybrid beamforming procedure in comparison to the codebook-based hybrid beamforming procedure. However, the UE may support improved beamforming complexity and processing overhead by using the codebook-based hybrid beamforming procedure as compared to the adaptive beam weight-based hybrid beamforming procedure.

As described herein, a device may support techniques for managing an adaptive beam weight-based hybrid beamforming procedure in accordance with a switch indication. In some examples, a UE may tailor beamforming operations in accordance with the sensing of a material surrounding—or otherwise near—the UE. For example, the UE may detect a material property (e.g., a dielectric property) of a material that is within a threshold distance from the UE. In some cases, the UE may classify the material with a material type based on the detected material property. Based on the detected material (e.g., the classification of the material), the UE may determine whether the cost associated with processing reference signals for beam weight learning is worth the performance gains that may result from the adaptive beam weight-based hybrid beamforming procedure in the presence of the material.

Based on the classified material type of the detected material, the UE may transmit, to a network entity, an indication of a switch from a codebook-based hybrid beamforming procedure to an adaptive beam weight-based hybrid beamforming procedure. For instance, if the UE classifies the material type to be one of relatively high conductivity (e.g., a metal or other material relatively close in dielectric property to a metal such as a human hand or body part made mostly of water which is a metallic conductor), the UE may transmit an indication of a switch to an adaptive beam weight-based hybrid beamforming procedure because the UE may determine that the processing cost for using the adaptive beam weight-based hybrid beamforming procedure may be worth the higher gain resulting from the relatively high conductivity material type. Alternatively, if the UE classifies the material type to be one of relatively low conductivity (e.g., wood), the UE may refrain from transmitting an indication of a switch to an adaptive beam weight-based hybrid beamforming procedure because the UE may determine that the processing cost for using the adaptive beam weight-based hybrid beamforming procedure may not be worth the lower gain resulting from the relatively low conductivity material type. In response to transmitting the indication of the switch to the adaptive beam weight-based hybrid beamforming procedure, the UE may receive one or more reference signals for beam weight learning and may perform beam weight estimation of an adaptive type to select one or more beam weights based on the one or more reference signals. In accordance with the adaptive beam weight-based hybrid beamforming procedure and the one or more reference signals, the UE may communicate (e.g., with a network entity, with another UE) using the one or more selected beam weights.

Aspects of the subject matter described herein may be implemented by a device to support reduced processing complexity at the UE. For example, the UE may refrain from transmitting an indication of a switch from a codebook-based beamforming procedure to an adaptive beam weight-based hybrid beamforming procedure based on one or more materials detected near the UE and may instead communicate using beam weights selected using the codebook-based beamforming procedure to support a reduced processing overhead associated with beamforming at the UE. Additionally, or alternatively, the UE may transmit the indication of the switch and communicate using beam weights estimated using the adaptive beam weight-based hybrid beamforming procedure to improve antenna array gain and—correspondingly—signal quality and communication reliability based on the one or more materials detected near the UE. Accordingly, the UE may manage saving processing resources (and thereby power consumption and the resultant thermal overhead) and supporting beam weight flexibility for performing beamforming operations with the switch indication, for example, based on material detection at the UE.

Aspects of the disclosure are initially described in the context of wireless communications systems. Examples of a material classification scheme, a machine learning process, and a process flow supporting techniques for managing an adaptive beam weight-based hybrid beamforming procedure are then described. Aspects of the disclosure are further illustrated by and described with reference to apparatus diagrams, system diagrams, and flowcharts that relate to switching to an adaptive beam weight-based hybrid beamforming procedure.

FIG. 1 illustrates an example of a wireless communications system 100 that supports techniques for managing an adaptive beam weight-based hybrid beamforming procedure in accordance with one or more aspects of the present disclosure. The wireless communications system 100 may include one or more network entities 105, one or more UEs 115, and a core network 130. In some examples, the wireless communications system 100 may be an LTE network, an LTE-Advanced (LTE-A) network, an LTE-A Pro network, an NR network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a network entity also discloses that a first network node being configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a second one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNB, a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support switching to an adaptive beam weight-based hybrid beamforming procedure as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). The region from 300 MHz to 3 GHz may be known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, or FR5, or may be within the EHF band.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use digital precoding, beamforming, or a combination thereof to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a CSI-RS, which may be precoded or unprecoded. The UE 115 may provide feedback for beam selection, which may be a precoding matrix indicator (PMI) or codebook-based feedback (e.g., feedback associated with a multi-panel type codebook, a linear combination type codebook, a port selection type codebook). Although some techniques are described herein with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples, the wireless communications system 100 may be a millimeter wave (mmW) system. In some cases, a device (e.g., a UE 115, a network entity 105) may use a carrier frequency in the "28" and "39" GHz mmW bands to communicate with other devices in the wireless communications system 100. Additionally, or alternatively, the device may use a carrier frequency in upper mmW bands (e.g., greater than 52.6 GHz such as the WiFi bands in 57 to 71 GHz) for communications. Additionally, or alternatively, the device may use a carrier frequency in sub-Terahertz bands (e.g., greater than 114.25 GHz) for communications. In some examples, a device in the wireless communications system 100 may use analog or hybrid beamforming applications to steer energy in specific directions of beamspace using one or more directional beams. Such analog or hybrid beamforming applications may be viewed as a static (e.g., directional beam) codebook approach, which may also be referred to as a codebook-based beamforming procedure.

In some cases, a device in the wireless communications system 100 may use a more flexible set of adaptive (e.g., dynamic) beam weights instead of the static codebook approach by performing an adaptive beam weight-based hybrid beamforming procedure. The device may use the adaptive beam weight-based hybrid beamforming procedure to mitigate signaling loss resulting from relatively wide angular spreads for a dominant cluster that captures the channel environment, multi-beam effects (e.g., multiple lobes across multiple clusters), side lobe control and hand blockage or UE-material related impairments, or polarization-specific impairments at the UE 115 (e.g., due to the housing of the UE 115, materials or sensors at the UE 115, or a combination thereof).

If the UE 115 performs a codebook-based beamforming procedure, the UE 115 may use static beam weights that are configured (e.g., set or otherwise defined) for a codebook. Alternatively, if the UE 115 performs an adaptive beam weight-based hybrid beamforming procedure, the UE 115 may use adaptive beam weights that the UE 115 may learn on-the-fly (e.g., according to a machine learning model, a heuristic, or some other beam weight selection process). For instance, a static beam weight steering energy along a 60° angle for a 4×1 array configuration may be in the form of Matrix 1.

$$[1 \; e^{j\pi \, sin(60°)} \; e^{j2\pi \, sin(60°)} \; e^{j3\pi \, sin(60°)}] \quad (1)$$

Alternatively, an adaptive beam weight steering energy for the same array configuration may be in the form of Matrix 2 or any other form according to a machine learning model.

$$[1 \; i \; -1 \; -i] \quad (2)$$

In some examples, the UE 115 may have no or negligible beam weight constraints for adaptive beam weights based on a quantity of layers (e.g., spatial layers) used at the UE 115. In some cases, the UE 115 may learn the beam weights using an online beam training process (e.g., similar to the process used for channel state feedback (CSF) but in the RF domain), or the UE 115 may determine the beam weights using a machine learning model that is trained offline.

In some cases, the performance of beamformed communications at the UE 115 may change based on the materials around the UE 115. For instance, in the wireless communications system 100, a UE 115 may be surrounded by—or located near—a material (e.g., wood, metal, a human hand, air or free space). Different materials may have different dielectric properties, such as reflectivity properties, conductivity properties, permissivity properties, or some combination thereof. Due to the various properties of different materials (e.g., dielectric properties) located around or proximate to the UE 115 (e.g., within a threshold distance from the UE 115 or from one or more sensors at the UE 115), the UE 115 may experience different effective array gain responses for beamformed communications, impacting the performance of beamformed communications at the UE 115. For example, materials that are relatively more conductive may spread energy coming from a single direction to many directions more easily than materials that are relatively less conductive. In contrast, materials that are relatively less conductive may concentrate energy coming from a single direction around that single direction. Accordingly, the effective array gain response of a signal transmitted by a UE 115 and reflected from a material may increase as the material around or near the antenna module of the UE 115 becomes more conductive.

The performance of beamformed communications at the UE 115 when surrounded by—or located near—a material may be improved when an adaptive beam weight-based hybrid beamforming procedure is used for the beamformed communications. In contrast, using a codebook-based hybrid beamforming procedure may reduce the processing complexity at the UE 115 associated with beamformed communications. For instance, to perform an adaptive beam weight-based hybrid beamforming procedure, the UE 115 may receive and process a relatively greater quantity of reference signals than for a codebook-based hybrid beamforming procedure. The relatively greater quantity of reference signals may support improved beamforming performance for the adaptive beam weight-based hybrid beamforming procedure. However, depending on one or more materials proximate to the UE 115, the UE 115 may prioritize reducing the processing overhead or improving the performance of the beamformed communications. Accordingly, the UE 115 may switch between the codebook-based hybrid beamforming procedure and the adaptive beam weight-based hybrid beamforming procedure based on material properties of materials detected proximate to the UE 115 to improve beamforming procedures.

Various aspects of the present disclosure relate to enabling a network entity 105 and a UE 115 to support signaling related to techniques for managing beamforming procedures in communications systems such as the wireless communications system 100. For example, a UE 115 may support switching between a codebook-based hybrid beamforming procedure and an adaptive beam weight-based hybrid beamforming procedure based on a material detection process. The UE 115 may tailor a beamforming approach to be used for beamforming communications in accordance with material sensing techniques performed at the UE 115 and a switch indication for switching to the adaptive beam weight-based hybrid beamforming procedure. The UE 115 may include a communications manager 101 and the network entity 105 may include a communications manager 102 in accordance with examples as disclosed herein. The communications manager 101 may be an example of aspects of a communications manager as described with reference to FIGS. 7 through 10. The communications manager 102 may be an example of aspects of a communications manager as described with reference to FIGS. 11 through 14.

The communications manager 101 may output or transmit, and the communications manager 102 may receive or obtain, an indication of a switch from a codebook-based hybrid beamforming procedure to an adaptive beam weight-based hybrid beamforming procedure. The communications manager 102 may output or transmit one or more reference signals in response to the indication of the switch to the adaptive beam weight-based hybrid beamforming procedure. The communications manager 101 may receive or obtain the one or more reference signals for beam training and beam weight selection. In accordance with one or more beam weights selected based on the adaptive beam weight-based hybrid beamforming procedure and the one or more reference signals, the communications manager 101 and the communications manager 102 may exchange further signaling such that the UE 115 may effectively communicate with the network entity 105 or other communication devices in the wireless communications system 100 as described herein.

Figure 2:
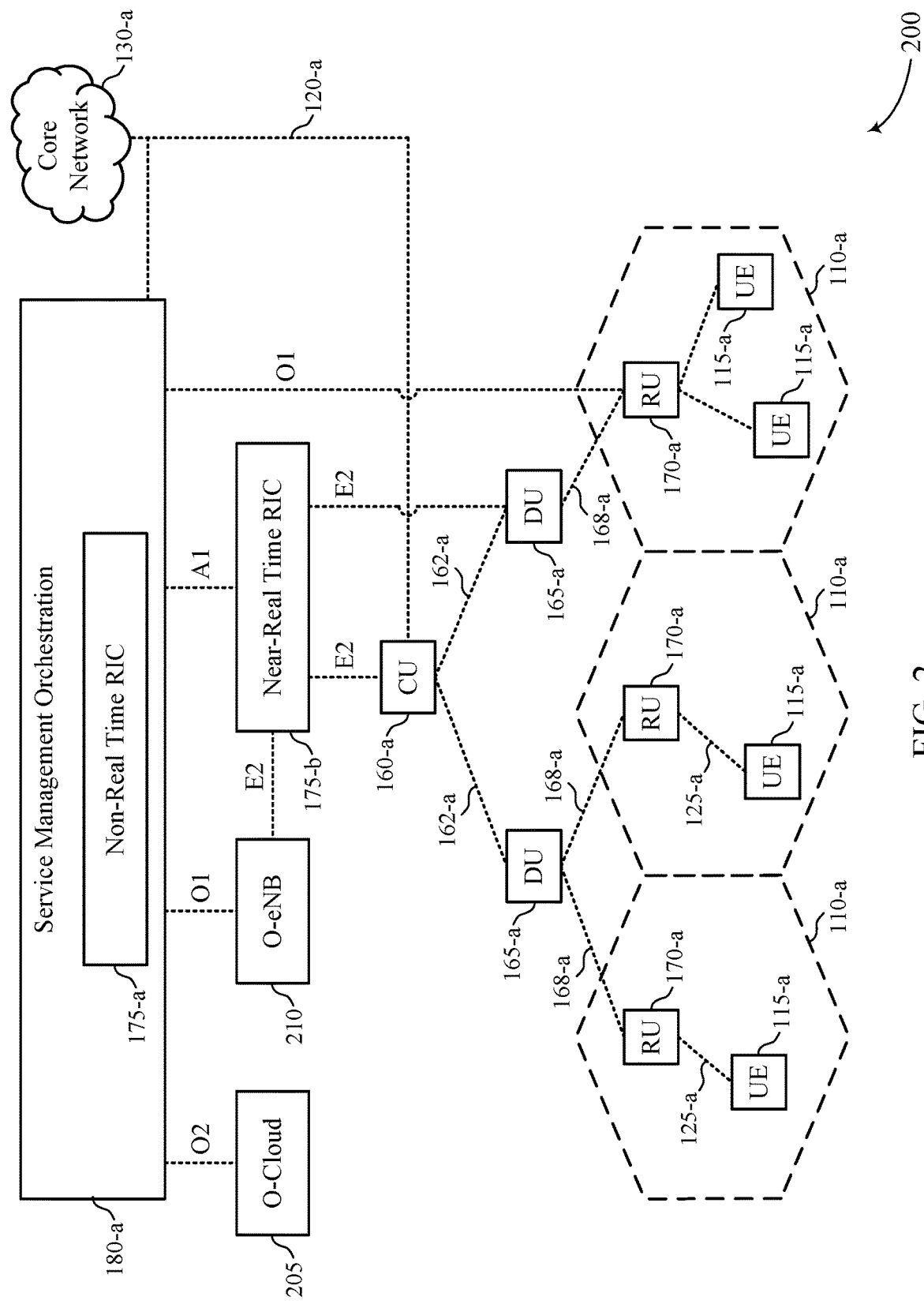
FIG. 2 illustrates an example of a network architecture that supports techniques for managing an adaptive beam weight-based hybrid beamforming procedure in accordance with one or more aspects of the present disclosure.

FIG. 2 illustrates an example of a network architecture 200 that supports techniques for managing an adaptive beam weight-based hybrid beamforming procedure in accordance with one or more aspects of the present disclosure. The network architecture 200 may be an example of a disaggregated base station architecture, a disaggregated RAN architecture, or both. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some examples, a UE 115-*a* may be concurrently served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based on the functional split, such as a lower-layer functional split. In such an architecture, an RU 170-*a* may be implemented to handle over the air (OTA) communication with one or more UEs 115-*a*. In some examples, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage thresholds which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some cases, the SMO 180-*a* may communicate with components configured in accordance with a 4G RAN (e.g., via an O1 interface). Additionally, or alternatively, in some examples, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or machine learning workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/machine learning models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or machine learning models to perform corrective actions through the SMO 180-*a* (e.g., reconfiguration via O1) or via generation of RAN management policies (e.g., A1 policies).

In some examples, the AI/machine learning models may support material classification, beam weight selection, or both. For example, a network entity 105 (e.g., an RU 170-*a*, a DU 165-*a*, a CU 160-*a*, or some combination thereof) may train a machine learning model to support material classification or beam weight selection and may signal the machine learning model (e.g., aspects of the machine learning model) to a UE 115-*a*. Additionally, or alternatively, the UE 115-*a* may train the machine learning model to support material classification or beam weight selection. The UE 115-*a* may use a machine learning model for material classification to determine whether a detected material proximate to the UE 115-*a* (e.g., within a threshold distance from the UE 115) triggers a switch to an adaptive beam weight-based hybrid beamforming procedure (or, in some cases, a switch to a codebook-based hybrid beamforming procedure). The UE 115-*a* may use a machine learning model for beam weight selection to select one or more beams (e.g., beamforming parameters) for communication if the UE 115-*a* is operating according to the adaptive beam weight-based hybrid beamforming procedure.

Figure 3:
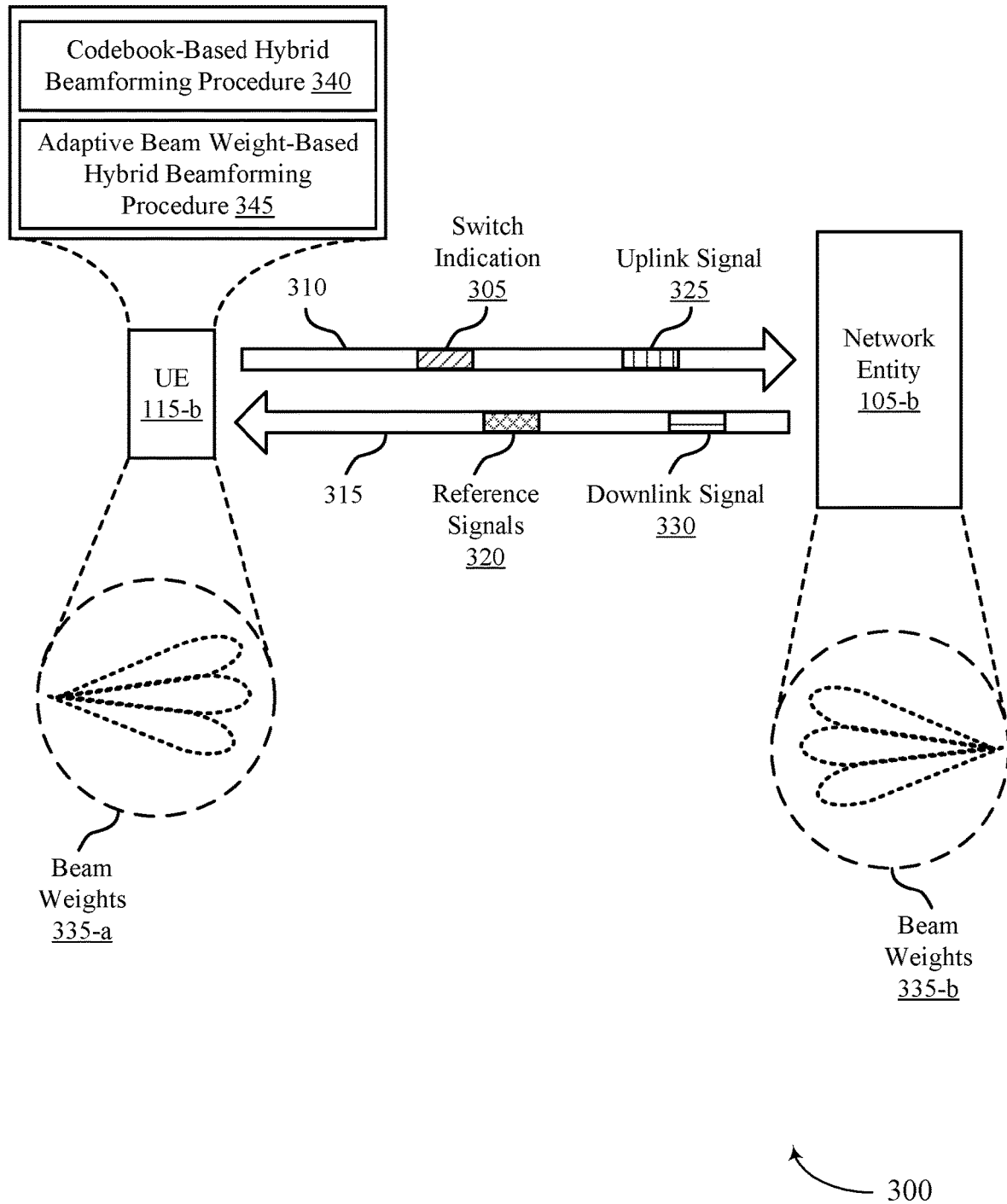
FIG. 3 illustrates an example of a wireless communications system that supports techniques for managing an adaptive beam weight-based hybrid beamforming procedure in accordance with one or more aspects of the present disclosure.

FIG. 3 illustrates an example of a wireless communications system 300 that supports techniques for managing an adaptive beam weight-based hybrid beamforming procedure 345 in accordance with one or more aspects of the present disclosure. The wireless communications system 300 may implement or be implemented by aspects of the wireless communications system 100. For example, the wireless communications system 300 may include a network entity 105-*b* and a UE 115-*b*, which may be examples of a network entity 105 (e.g., an RU 170, a DU 165, a CU 160, a base station 140, or some combination thereof) and a UE 115 as described with reference to FIGS. 1 and 2. The network entity 105-*b* and the UE 115-*b* may communicate with one another via an uplink channel 310 and a downlink channel 315, which may be examples or components of a communication link 125 as described with reference to FIG. 1. The UE 115-*b* may support techniques for managing an adaptive beam weight-based hybrid beamforming procedure 345. By managing the adaptive beam weight-based hybrid beamforming procedure 345, the UE 115-*b* may manage processing complexity at the UE 115-*b* by determining whether the cost of processing one or more reference signals is worth the performance gain resulting from an adaptive beam weight-based hybrid beamforming procedure 345, promoting resource efficiency and improved beamforming procedures for the wireless communications system 300.

Different materials around the UE 115-*b* may cause different reflection responses for a signal transmitted by the UE 115-*b*, resulting in different effective array gain behaviors observed at the UE 115-*b* (e.g., over a multi-antenna array). For instance, a human hand or body may be located around or near the UE 115-*b* (e.g., if the UE 115-*b* is a mobile phone being held by a human). Additionally, or alternatively, the UE 115-*b* may be placed on a wooden desk or near a metallic object. Additionally, or alternatively, different protective cases or covers of plastic, silicone, leather, or some other material may surround the UE 115-*b*. In some examples, the shape of an object around the UE 115-*b* (e.g., a plastic, silicon, or leather case enveloping the UE 115-*b* in multiple dimensions versus a table being located in one direction from the UE 115-*b*) may impact the array gain performance at the UE 115-*b*.

In some examples, the UE 115-*b* may detect one or more materials within a threshold distance of the UE 115-*b*. In some cases, the UE 115-*b* may classify a material (e.g., with a material type or classification from a configured list of supported material types or classifications) using a machine learning model. For instance, the UE 115-*b* may detect different materials as well as the shapes of the materials based on measuring spectral responses with a frequency modulated continuous wave (FMCW) radar or other reflectivity test (e.g., using capacitive sensors, radar sensors or components, or any other detection mechanism). The machine learning model may be trained online (e.g., by the UE 115-*b*) or offline (e.g., by the UE 115-*b*, the network entity 105-*b*, or another device or system) to classify a material based on one or more spectral responses or other parameters of the material. For example, to train the machine learning model, a set of materials may be labeled with types or classifications, and a system or device may input spectral responses or other parameters associated with the materials into the machine learning model to train the model to output the proper types or classifications. Accordingly, the system or device may train a machine learning model (e.g., a neural network) to classify materials (e.g., with coarse or fine classifications) based on detected material properties (e.g., from spectral responses). Coarse or fine classifications may refer to a quantity of different material types or classifications supported by the model. For example, a coarse classification may indicate a material type from less than a threshold quantity of different types, while a fine classification may indicate a material type from more than the threshold quantity of different types. In some cases, the model training may involve user feedback or other feedback to tune the model parameters and improve the classification process. The machine learning model may continue to learn during operation by the UE 115-b or may be trained prior to operation at the UE 115-b.

The UE 115-b may use the trained machine learning model to classify a detected material, for example, based on a spectral response from the material (e.g., in response to a radar signal or other signal). Additionally, or alternatively, the UE 115-b may sense dielectric constants of different materials via polarization tests, similar to a weather radar where horizontal transmit, vertical receive (H-V) polarization rotations may be used to classify the presence of cloudy, rainy, or sunny days. Accordingly, a material around the UE 115-b may be detected, classified, or both based on the spectral responses of the material. That is, the UE 115-b may classify the material with a material type from multiple supported material types based on a detected dielectric property, a detected conductivity property, or both.

For example, the UE 115-b may transmit a radar waveform, receive a reflection of the radar waveform from a material that is within a threshold distance from the UE 115-b, and estimate or obtain a distortion metric of the reflection of the radar waveform. The UE 115-b may detect a material property of the material based on whether the distortion metric satisfies (e.g., exceeds) or fails to satisfy a distortion threshold. The distortion threshold may be predetermined and pre-configured for the UE 115-b. Additionally, or alternatively, the distortion threshold may be configured for the UE 115-b via RRC signaling, MAC-CE signaling, DCI signaling, or other configuration signaling types by the network entity 105-b. In some cases, the UE 115-b may dynamically select the distortion threshold based on one or more other parameters (e.g., a reliability threshold, a latency threshold, a channel metric). Accordingly, the UE 115-b may classify a material or surface with dielectric or conductivity properties that may impact the distortion metric of a signal transmitted by the UE 115-b.

In some aspects, the classification network (e.g., machine learning model) used by the UE 115-b may perform coarse or fine resolution detection. For instance, in some examples, the UE 115-b may perform a binary classification of a detected material and determine whether the material is human or non-human in an application for maximum permissible exposure (MPE) detection. As such, the UE 115-b may determine whether MPE thresholds are met if a human is detected to be within the threshold distance of the UE 115-b. In some other examples, the UE 115-b may perform a fine resolution detection of materials (e.g., within a non-human class). In some such examples, the UE 115-b may receive, from the network entity 105-b or some other transmitter, assistance information on a candidate list of materials that may potentially be detected. For instance, the UE 115-b may receive assistance information that indicates multiple material types for classification, and the UE 115-b may classify the material with a material type based on the assistance information. In some cases, the network entity 105-b may acquire such assistance information through visual-aided or perception-based communications, machine learning approaches, or other approaches of the like, and the network entity 105-b may transmit the assistance information to the UE 115-b. Additionally, or alternatively, the network entity 105-b may provide the assistance information to the UE 115-b based on location information across different UEs 115 (e.g., if phones are placed on the same table).

In some aspects, the UE 115-b may switch from one analog/hybrid beamforming codebook (e.g., codebook$_1$) to another codebook (e.g., codebook$_2$) based on a material type sensed by the UE 115-b. The UE 115-b may switch across codebooks within a class of codebooks or between different classes of codebooks. The codebooks may have different sizes (e.g., quantities of beam weights), different beam properties (e.g., main lobe level, side lobe level, beamwidth properties), different phase or amplitude quantization levels, different other properties, or any combination thereof. For instance, the UE 115-b may detect a material property for a material within a threshold distance from the UE 115-b. Based on the detected material property (e.g., a dielectric property) for the material, the UE 115-b may communicate using a codebook-based hybrid beamforming procedure 340. Additionally, based on the codebook-based hybrid beamforming procedure 340 and the detected material property for the material, the UE 115-b may select a codebook from a set of codebooks. For example, the UE 115-b may select a second codebook associated with a relatively finer grid of beams than a first codebook associated with a relatively coarser grid of beams, and the UE 115-b may perform beamformed communications using the second codebook.

In some other aspects, the UE 115-b may switch from the codebook-based hybrid beamforming procedure 340 to an adaptive beam weight-based hybrid beamforming procedure 345 based on a material type sensed by the UE 115-b. For instance, the UE 115-b may transmit a radar waveform, receive a reflection of the radar waveform from a material within a threshold distance from the UE 115-b, and determine a distortion metric of the reflection of the radar waveform. The UE 115-b may determine that the distortion metric of the reflection of the radar waveform satisfies a distortion threshold. Because the distortion metric of the reflection of the radar waveform satisfies the distortion threshold, the UE 115-b may determine that the processing overhead associated with using the adaptive beam weight-based hybrid beamforming procedure 345 is worth the expected performance gain. Accordingly, the UE 115-b may transmit an indication of the switch (e.g., a switch indication 305) from a codebook-based hybrid beamforming procedure 340 to an adaptive beam weight-based hybrid beamforming procedure 345. For instance, the UE 115-b in the presence of a hand may be expected to have relatively greater gains using adaptive beam weights 335-a (as opposed to a static codebook) than the UE 115-b in the presence of wood. Accordingly, the UE 115-b in the presence of a hand may use the adaptive beam weight-based hybrid beamforming procedure 345 (e.g., to improve beamformed communication performance), and the UE 115-b in the presence of wood may use the codebook-based hybrid beamforming procedure 340 (e.g., to save processing overhead).

In some examples, the UE 115-b may input one or more waveform parameters of the reflection of the radar waveform into the machine learning model, where the one or more waveform parameters may include at least the distortion metric. By using the machine learning model, the UE 115-*b* may learn adaptive or dynamic beam weights for beamformed communications on-the-fly. The UE 115-*b* may classify the material with a material type in accordance with an output of the machine learning model based on the one or more waveform parameters input into the machine learning model.

For the adaptive beam weight-based hybrid beamforming procedure 345, the UE 115-*b* may estimate and select one or more beam weights 335-*a* dynamically using a set of system resources. For instance, the UE 115-*b* may receive, in response to the switch indication 305, one or more reference signals 320. The one or more reference signals 320 may include one or more CSI-RSs, one or more SRSs, or a combination thereof for beam weight estimation and selection. Additionally, or alternatively, the UE 115-*b* may receive, in response to the switch indication 305, a control signal that allocates one or more resources for the one or more reference signals 320, and the UE 115-*b* may receive the one or more reference signals 320 in the configured resources. Based on the one or more reference signals 320, the UE 115-*b* may dynamically perform beam weight estimation, where the one or more beam weights 335-*a* may be selected based on the beam weight estimation. Additionally, or alternatively, the network entity 105-*b* may dynamically perform beam weight estimation, where one or more beam weights 335-*b* may be selected based on the beam weight estimation. The one or more beam weights 335-*b* may be associated with or correspond to the one or more beam weights 335-*a*.

The UE 115-*b* may communicate in accordance with the one or more beam weights 335-*a* selected based on the adaptive beam weight-based hybrid beamforming procedure 345 and the one or more reference signals 320. Additionally, or alternatively, the network entity 105-*b* may communicate in accordance with the one or more beam weights 335-*b* selected based on the adaptive beam weight-based hybrid beamforming procedure 345. For example, the UE 115-*b* may transmit an uplink signal 325 to the network entity 105-*b* using the beam weights 335-*a* selected from the adaptive beam weight-based hybrid beamforming procedure 345. The network entity 105-*b* may receive the uplink signal 325 using the beam weights 335-*b* selected from the adaptive beam weight-based hybrid beamforming procedure 345. Additionally, or alternatively, the network entity 105-*b* may transmit a downlink signal 330 to the UE 115-*b* using the beam weights 335-*b* selected from the adaptive beam weight-based hybrid beamforming procedure 345, and the UE 115-*b* may receive the downlink signal 330 using the beam weights 335-*a* selected from the adaptive beam weight-based hybrid beamforming procedure 345. For example, the beam weights 335-*a* may correspond to one or more uplink transmit beams, downlink receive beams, or a combination thereof. The beam weights 335-*b* may correspond to one or more uplink receive beams, downlink transmit beams, or a combination thereof.

Figure 4:
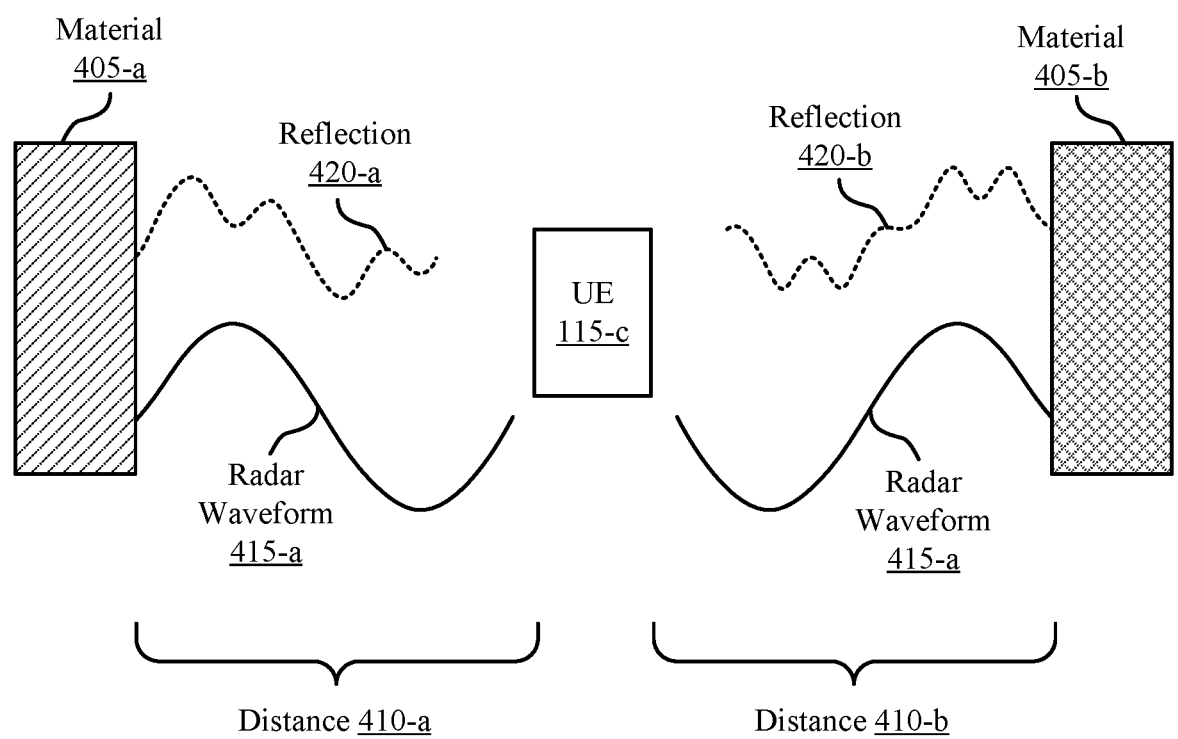
FIG. 4 illustrates an example of a material classification scheme that supports techniques for managing an adaptive beam weight-based hybrid beamforming procedure in accordance with one or more aspects of the present disclosure.

FIG. 4 illustrates an example of a material classification scheme 400 that supports techniques for managing an adaptive beam weight-based hybrid beamforming procedure in accordance with one or more aspects of the present disclosure. The material classification scheme 400 may be implemented by aspects of the wireless communications system 100, the network architecture 200, the wireless communications system 300, or some combination thereof. For example, a UE 115-*c*, which may be an example of a UE 115 as described with reference to FIGS. 1 through 3, may implement the material classification scheme 400. The UE 115-*c* may support techniques for managing an adaptive beam weight-based hybrid beamforming procedure based on the material classification scheme 400. By managing the adaptive beam weight-based hybrid beamforming procedure, the UE 115-*c* may manage processing complexity at the UE 115-*c* by determining whether to process one or more reference signals to support a performance gain for beamformed communications according to the adaptive beam weight-based hybrid beamforming procedure.

In some examples, one or more materials may be within a threshold distance from the UE 115-*c*. For example, a material 405-*a* may be within a threshold distance from the UE 115-*c*. Additionally, or alternatively, a material 405-*b* may be within the threshold distance from the UE 115-*c*. In some examples, the material 405-*b* may be a second material that is different from the material 405-*a*.

The material 405-*a* and the material 405-*b* may be associated with material properties, including one or more dielectric properties, one or more conductivity properties, or some combination thereof. If the material 405-*a* is different from the material 405-*b*, the material 405-*a* and the material 405-*b* may each have a different dielectric property, conductivity property, or both. In some cases, the UE 115-*c* may support classifying the materials (e.g., with a material type, a material classification). For instance, the UE 115-*c* may support classifying a material as wood, skin, or metal. On a scale of conductivity, a set of materials proximate to the UE 115-*c* may be ranked, at least, as the following (from least conductive to most conductive): free space (e.g., no detected material), wood, skin (e.g., a human hand), and metal. In a non-limiting example, the material 405-*a* may have a relatively high conductivity (e.g., metal), and the material 405-*b* may have a relatively low conductivity (e.g., wood). As such, the material 405-*a* may be relatively more conductive than the material 405-*b*. Accordingly, the same signaling transmitted by the UE 115-*c* may perform differently in the presence of the material 405-*a* as compared to the material 405-*b*.

In some examples, the UE 115-*c* may include an FMCW radar for MPE detection. In some cases, the FMCW radar may be associated with an antenna module (e.g., on a back mount) of the UE 115-*c*. The UE 115-*c* may use the FMCW radar to determine the presence or absence of a material (e.g., fingers or skin, a table, a phone case) in a nearby vicinity, or within a threshold distance, of the UE 115-*c*. For instance, the UE 115-*c* may transmit a radar waveform 415-*a* from a set of antennas (e.g., from the antenna module including the FMCW radar component), the radar waveform 415-*a* may bounce off a material 405-*a*, and the UE 115-*c* may use the same set of antennas to receive a reflection 420-*a* of the radar waveform 415-*a*. Additionally, or alternatively, the radar waveform 415-*a* or a different radar waveform may bounce off a material 405-*b*, and the UE 115-*c* may receive the reflection 420-*b* of the radar waveform 415-*a* reflected by the material 405-*b*. Based on receiving the reflection 420-*a* of the radar waveform 415-*a*, the FMCW radar of the UE 115-*c* may determine a distance 410-*a* between the material 405-*a* and the UE 115-*c*. Additionally, or alternatively, the FMCW radar of the UE 115-*c* may determine whether or not the material 405-*a* is moving based on receiving the reflection 420-*a*. Similarly, based on receiving the reflection 420-*b* of the radar waveform 415-*a*, the FMCW radar of the UE 115-*c* may determine a distance 410-*b* between the material 405-*b* and the UE 115-*c*. Additionally, or alternatively, the FMCW radar of the UE 115-*c* may determine whether or not the material 405-*b* is moving based on receiving the reflection 420-*b*. As such, the UE 115-*c* may detect the material 405-*a* if the distance 410-*a* is equal to or less than a threshold distance from the UE 115-*c*. Additionally, or alternatively, the UE 115-*c* may detect the material 405-*b* if the distance 410-*b* is equal to or less than the threshold distance. The threshold distance for detection by the UE 115-*c* may be pre-configured or may correspond to a parameter received at the UE 115-*c* via higher layer signaling (e.g., RRC signaling from a network entity 105).

In some examples, the conductivity of the material 405-*a* and the material 405-*b* may directly correlate to a gain response of a signal transmitted by the UE 115-*c*. Additionally, the reflection of the signal rebounding from a material may indicate the conductivity of the material (e.g., a gain response of the radar waveform 415-*a* with the reflection 420-*a* or the reflection 420-*b* may indicate the conductivity). For example, for the set of materials including wood, skin, and metal, the effective array gain response of a transmitted signal reflected from each of the set of materials may be ranked similarly to that for conductivity, as the following (from least gain to most gain): freespace (e.g., no blocking material), wood, skin, and metal. Freespace (e.g., no blocking material), wood, and other materials associated with relatively less gain may be classified as low-loss (e.g., non-dispersive) dielectric materials, and skin, metal, and other materials associated with relatively more gain may be classified as high-loss (e.g., dispersive) dielectric materials. In some examples, the material 405-*a* may be a high-loss dielectric material, and the material 405-*b* may be a low-loss dielectric material. In some cases, classifying the materials may include a binary classification, for example, as either a high-loss or a low-loss dielectric material.

Because the material 405-*a* and the material 405-*b* may have different reflectivity, conductivity, permissivity, or dielectric properties, the material 405-*a* and the material 405-*b* may have different capabilities of distorting the array gain response of a signal transmitted from the UE 115-*c*. For example, if the material 405-*a* is a high-loss dielectric material with a relatively high conductive property, the reflection 420-*a* may be a relatively heavy distortion of the radar waveform 415-*a* (e.g., above a distortion threshold). Additionally, or alternatively, if the material 405-*b* is a low-loss dielectric material with a relatively low conductive property, the reflection 420-*b* may be a relatively light distortion of the radar waveform 415-*a* (e.g., below a distortion threshold). As such, a material with a low-loss dielectric property may lead to relatively fewer or less substantial distortions of the radar waveform 415-*a* than a material with a high-loss dielectric property.

The performance of beamformed communications at the UE 115-*c* when surrounded or near either or both of the material 405-*a* and the material 405-*b* may change based on whether the UE 115-*c* uses the adaptive beam weight-based hybrid beamforming procedure or the codebook-based beamforming procedure to select beam weights for beamformed communications. In some cases, comparison between the performance gain of beamformed communications at the UE 115-*c* using the adaptive beam weight-based hybrid beamforming procedure and the performance gain of beamformed communications at the UE 115-*c* using the codebook-based beamforming procedure may be determined for the material 405-*a* and the material 405-*b* by estimating a sum SNR gain over 2-layer polarization transmissions with adaptive beam weights over a static codebook.

For instance, if the material 405-*b* is wood and the material 405-*a* is a human hand, the material 405-*a* may reflect more transmitted signals onto the antennas of the UE 115-*c* than the material 405-*b* because the human hand (a high-loss dielectric material) is relatively more conductive than wood (a low-loss dielectric material). Because the human hand may reflect more signals onto the antennas of the UE 115-*c*, the human hand may distort the effective array response observed by the multiple antenna array of the UE 115-*c* more dramatically. The distortions of the array gain response of a signal transmitted from or to the UE 115-*c* (e.g., the radar waveform 415-*a*) and reflected by the material 405-*a* or the material 405-*b* (e.g., the reflection 420-*a* or the reflection 420-*b*) may be undone or otherwise mitigated by the selection of adaptive beam weights in the adaptive beam weight-based hybrid beamforming procedure. For instance, adaptive beam weights may focus on multiple clusters in a channel and combine energy across these clusters, whereas static beam weights may focus on a single, or dominant, cluster in the channel. As such, adaptive beam weights may mitigate the high-loss dielectric properties of some materials, such as a human hand.

Because high-loss dielectric materials tend to spread energy in more directions than low-loss dielectric materials, performance gains for beamformed communications when using the adaptive beam weight-based hybrid beamforming procedure may be more dramatic with high-loss dielectric materials, such as the human hand, than with low-loss dielectric materials, such as wood. For instance, performance gains for beamformed communications when using the adaptive beam weight-based hybrid beamforming procedure with a hand may be 95% with a human hand and 80% with wood, with median gains being greater than 3 decibels (dB) for a human hand and greater than 1 dB for wood.

Although the adaptive beam weight-based procedure may lead to performance gains for beamformed communications near low-loss dielectric materials, such as the material 405-*b*, and high-loss dielectric materials, such as the material 405-*a*, the UE 115-*c* may process additional reference signals (e.g., CSI-RSs) to support beam weight learning for the adaptive beam weight-based procedure. In some applications, the cost of processing the greater quantity of reference signals may offset the performance gains of using the adaptive beam weights. Accordingly, the UE 115-*c* may classify the material near or around the UE 115-*c* and may determine as to whether the processing overhead cost of using the adaptive beam weight-based hybrid beamforming procedure associated with more reference signals is worth the performance gains of the resulting beamformed communications.

In the material classification scheme 400, the UE 115-*c* may classify a material type by determining whether or not the energy from a signal direction is spread across many directions. In some examples, a distortion threshold may be configured for the UE 115-*c* (e.g., by a network entity 105 or by an original equipment manufacturer (OEM)), and the UE 115-*c* may communicate using the adaptive beam weight-based hybrid beamforming procedure based on a distortion metric of the reflection 420-*a* or of the reflection 420-*b* that satisfies the distortion threshold. For instance, the distortion metric of the reflection 420-*a* may exceed the distortion threshold. In some examples, the distortion metric may measure an average difference (e.g., in amplitude, in frequency) between the radar waveform 415-*a* and the reflection 420-*a* or may measure a peak difference (e.g., in amplitude, in frequency) between the radar waveform 415-*a* and the reflection 420-*a*. Accordingly, the UE 115-*c* may classify the material to be a high-loss dielectric material type and dynamically select beam weights for beamformed communications using the adaptive beam weight-based hybrid beamforming procedure in the presence of the material 405-*a*. Additionally, or alternatively, the distortion metric of the reflection 420-*b* may be below the distortion threshold. Accordingly, the UE 115-*c* may classify the material 405-*b* to be a low-loss dielectric material type and select beam weights for beamformed communications using the codebook-based hybrid beamforming procedure in the presence of the material 405-*b*.

Figure 5:
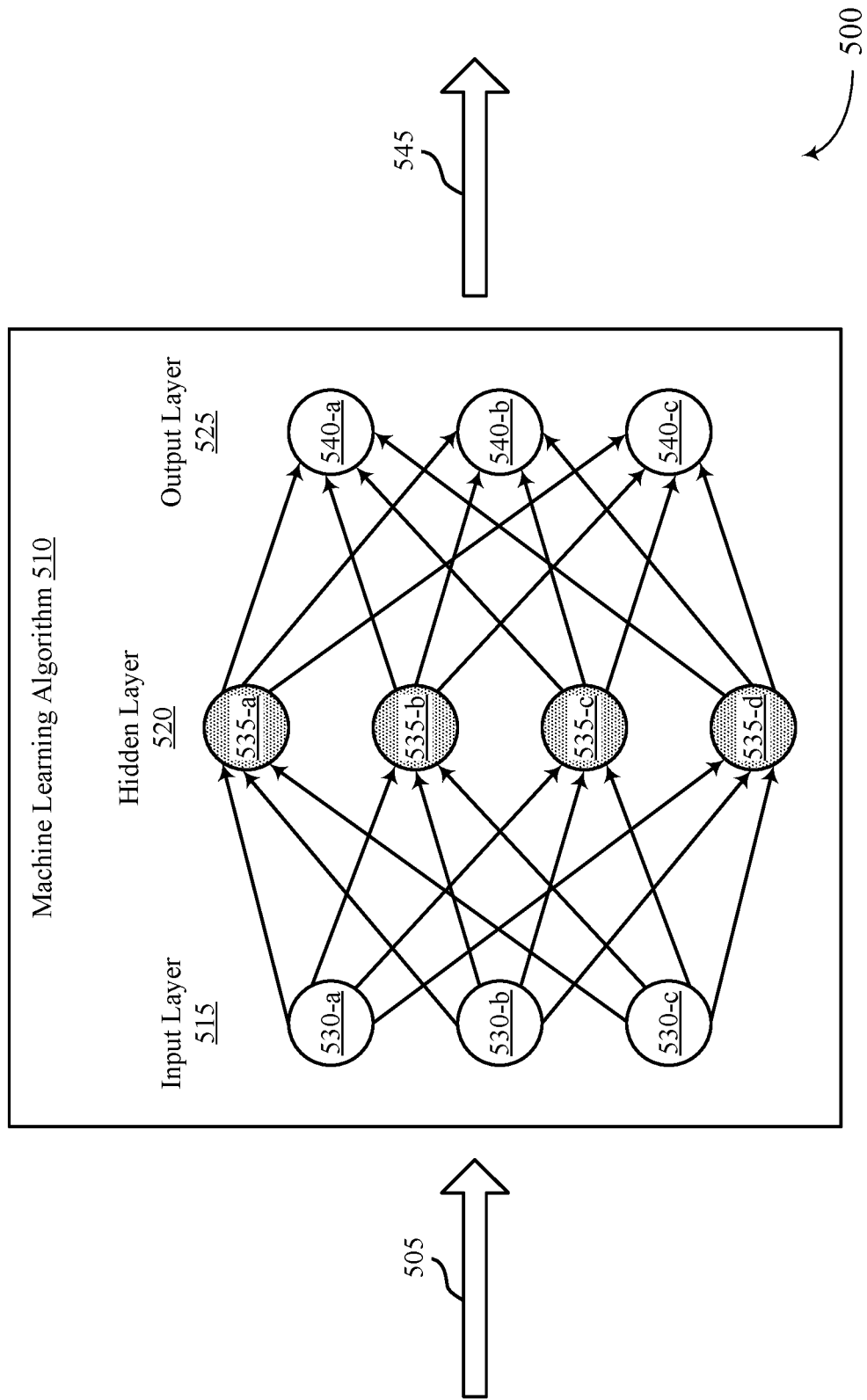
FIG. 5 illustrates an example of a machine learning process that supports techniques for managing an adaptive beam weight-based hybrid beamforming procedure in accordance with one or more aspects of the present disclosure.

FIG. 5 illustrates an example of a machine learning process 500 that supports techniques for managing an adaptive beam weight-based hybrid beamforming procedure in accordance with one or more aspects of the present disclosure. The machine learning process 500 may be implemented at a network entity 105, or a UE 115, or both as described with reference to FIGS. 1 through 4.

The machine learning process 500 may include a machine learning algorithm 510. As illustrated, the machine learning algorithm 510 may be an example of a neural network, such as a feed forward (FF) or deep feed forward (DFF) neural network, a recurrent neural network (RNN), a long/short term memory (LSTM) neural network, or any other type of neural network. However, any other machine learning algorithms may be supported. For example, the machine learning algorithm 510 may implement a nearest neighbor algorithm, a linear regression algorithm, a Naïve Bayes algorithm, a random forest algorithm, or any other machine learning algorithm. Furthermore, the machine learning process 500 may involve supervised learning, unsupervised learning, semi-supervised learning, reinforcement learning, or any combination thereof.

The machine learning algorithm 510 may include an input layer 515, one or more hidden layers 520, and an output layer 525. In a fully connected neural network with one hidden layer 520, each hidden layer node 535 may receive a value from each input layer node 530 as input, where each input may be weighted. These neural network weights may be based on a cost function that is revised during training of the machine learning algorithm 510. Similarly, each output layer node 540 may receive a value from each hidden layer node 535 as input, where the inputs are weighted. If post-deployment training (e.g., online training) is supported, memory may be allocated to store errors or gradients for reverse matrix multiplication. These errors or gradients may support updating the machine learning algorithm 510 based on output feedback. Training the machine learning algorithm 510 may support computation of the weights (e.g., connecting the input layer nodes 530 to the hidden layer nodes 535 and the hidden layer nodes 535 to the output layer nodes 540) to map an input pattern to a desired output outcome. This training may result in a device-specific machine learning algorithm 510 based on the historic application data and data transfer for a specific network entity 105 or UE 115.

In some examples, input values 505 may be sent to the machine learning algorithm 510 for processing. In some examples, preprocessing may be performed according to a sequence of operations on the input values 505 such that the input values 505 may be in a format that is compatible with the machine learning algorithm 510. The input values 505 may be converted into a set of k input layer nodes 530 at the input layer 515. In some cases, different measurements may be input at different input layer nodes 530 of the input layer 515. Some input layer nodes 530 may be assigned default values (e.g., values of 0) if the quantity of input layer nodes 530 exceeds the quantity of inputs corresponding to the input values 505. As illustrated, the input layer 515 may include three input layer nodes 530-*a*, 530-*b*, and 530-*c*. However, it is to be understood that the input layer 515 may include any quantity of input layer nodes 530 (e.g., 20 input nodes).

The machine learning algorithm 510 may convert the input layer 515 to a hidden layer 520 based on a quantity of input-to-hidden weights between the k input layer nodes 530 and then hidden layer nodes 535. The machine learning algorithm 510 may include any quantity of hidden layers 520 as intermediate steps between the input layer 515 and the output layer 525. Additionally, each hidden layer 520 may include any quantity of nodes. For example, as illustrated, the hidden layer 520 may include four hidden layer nodes 535-*a*, 535-*b*, 535-*c*, and 535-*d*. However, it is to be understood that the hidden layer 520 may include any quantity of hidden layer nodes 535 (e.g., 10 input nodes). In a fully connected neural network, each node in a layer may be based on each node in the previous layer. For example, the value of hidden layer node 535-*a* may be based on the values of input layer nodes 530-*a*, 530-*b*, and 530-*c* (e.g., with different weights applied to each node value).

The machine learning algorithm 510 may determine values for the output layer nodes 540 of the output layer 525 following one or more hidden layers 520. For example, the machine learning algorithm 510 may convert the hidden layer 520 to the output layer 525 based on a quantity of hidden-to-output weights between the n hidden layer nodes 535 and the m output layer nodes 540. In some cases, n=m. Each output layer node 540 may correspond to a different output value 545 of the machine learning algorithm 510. As illustrated, the machine learning algorithm 510 may include three output layer nodes 540-*a*, 540-*b*, and 540-*c*, supporting three different threshold values. However, it is to be understood that the output layer 525 may include any quantity of output layer nodes 540. In some examples, post-processing may be performed on the output values 545 according to a sequence of operations such that the output values 545 may be in a format that is compatible with reporting the output values 545.

The machine learning algorithm 510 may support material classification, adaptive beam weight selection, or both. For example, for material classification, the input values 505 may include distortion metrics for a reflected radar signal (e.g., an FMCW waveform), material properties, or other information relating to a detected material. The output values 545 may classify the material, for example, between to binary output values (e.g., low-less dielectric or high-loss dielectric) or between multiple material types (e.g., wood, skin, metal, plastic, leather). For adaptive beam weight selection, the input values 505 may include reference signal measurements (e.g., a reference signal received power (RSRP), a reference signal received quality (RSRQ), an SNR value) for multiple reference signals received from another device (e.g., a network entity 105), and the output values 545 may include beam weights for communication beams (e.g., a receive beam, a transmit beam, or both).

Figure 6:
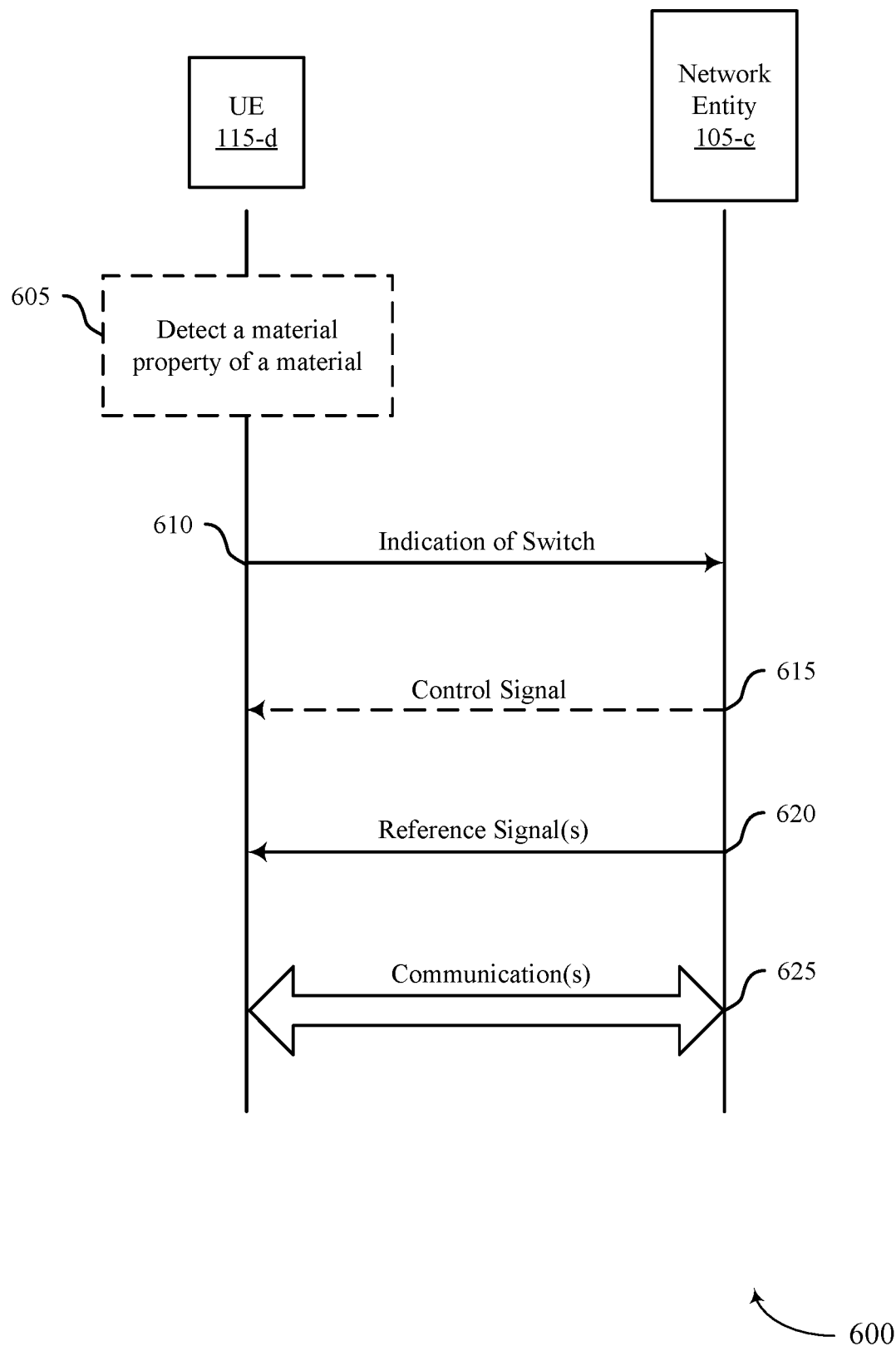
FIG. 6 illustrates an example of a process flow that supports techniques for managing an adaptive beam weight-based hybrid beamforming procedure in accordance with one or more aspects of the present disclosure.

FIG. 6 illustrates an example of a process flow 600 that supports techniques for managing an adaptive beam weight-based hybrid beamforming procedure in accordance with one or more aspects of the present disclosure. The process flow 600 may include a network entity 105-*c* and a UE 115-*d*, which may be examples of a network entity 105 and a UE 115 as described with reference to FIGS. 1 through 5. The process flow 600 may be implemented by the network entity 105-*c* and the UE 115-*d* to allow the UE 115-*d* to switch to an adaptive beam weight-based hybrid beamforming procedure in accordance with a material surrounding or nearby the UE 115-*d*. In the following description of the process flow 600, the operations between the network entity 105-c and the UE 115-d may be performed in a different order than the example order shown. Some operations may be omitted from the process flow 600, and other operations may be added to the process flow 600.

In some examples, at 605, the UE 115-d may detect a material property of a material that is within a threshold distance from the UE 115-d. Additionally, or alternatively, the UE 115-d may detect a second material property for a second material within the threshold distance from the UE 115-d. For instance, the UE 115-d may detect a dielectric property, a conductive property, or both for a material within a threshold distance from the UE 115-d. The UE 115-d may classify the material with a material type from a set of multiple material types based on the detected dielectric property, the detected conductivity property, or both. In some examples, the UE 115-d may receive (e.g., from the network entity 105-c) assistance information that indicates the set of multiple material types for classification. In some such examples, the material may be classified with the material type based on the assistance information.

In some examples, the UE 115-d may detect the material property of the material that is within a threshold distance from the UE 115-d based on a distortion metric of a reflection of a radar waveform transmitted by the UE 115-d and reflected from the material. For instance, the UE 115-d may transmit a radar waveform and receive, in response to the radar waveform, a reflection of the radar waveform from the material within the threshold distance from the UE 115-d. The UE 115-d may determine the material property of the material based on the distortion metric of the reflection of the radar waveform satisfying a distortion threshold. For example, a material with relatively high conductivity may correspond to a relatively high distortion metric (e.g., satisfying or otherwise exceeding the distortion threshold). Additionally, or alternatively, a material with relatively low conductivity may correspond to a relatively low distortion metric (e.g., failing to satisfy or otherwise falling below the distortion threshold). If the UE 115-d transmits a radar waveform and receives, in response to the radar waveform, a reflection of the radar waveform, the UE 115-d may determine the distortion metric of the reflection of the radar waveform. If the distortion metric is equal to or below a low distortion threshold, the UE 115-d may determine that the material has low conductivity. Additionally, or alternatively, if the distortion metric is equal to or above a high distortion threshold, the UE 115-d may determine that the material has high conductivity. In some examples, the low distortion threshold and the high distortion threshold may be a same distortion threshold (e.g., for binary classification).

For example, the UE 115-d may transmit the radar waveform and receive, in response to the radar waveform, a reflection of the waveform from the material within the threshold distance from the UE 115-d. The UE 115-d may input one or more waveform parameters of the reflection of the radar waveform into a machine learning model, where the one or more waveform parameters include at least the distortion metric. Based on the one or more waveform parameters input into the machine learning model, the UE 115-d may classify the material with a material type in accordance with an output of the machine learning model.

At 610, the UE 115-d may transmit, and the network entity 105-c may receive (e.g., obtain), an indication of a switch from a codebook-based hybrid beamforming procedure to an adaptive beam weight-based hybrid beamforming procedure. For example, the UE 115-d may switch to the adaptive beam weight-based hybrid beamforming procedure based on the detected material corresponding to a high-loss dielectric. Additionally, or alternatively, the UE 115-d may operate according to the codebook-based hybrid beamforming procedure (e.g., if the detected material corresponds to a low-loss dielectric) and may select a codebook from a set of multiple codebooks based on the codebook-based hybrid beamforming procedure and the detected material. In some examples, the UE 115-d may transmit an indication of the selected codebook to the network entity 105-c.

In some examples, at 615, the network entity 105-c may transmit (e.g., output), and the UE 115-d may receive, a control signal that allocates one or more resources for one or more reference signals. The UE 115-d may receive the control signal in response to the indication of the switch to the adaptive beam weight-based hybrid beamforming procedure. For example, the network entity 105-c may configure additional reference signal resources to support adaptive beam weight selection. The control signal may be an example of an RRC signal, a MAC-CE, or a DCI signal configuring the additional reference signal resources for the UE 115-d.

At 620, the network entity 105-c may transmit (e.g., output), and the UE 115-d may receive, one or more reference signals in response to the indication of the switch to the adaptive beam weight-based hybrid beamforming procedure. The UE 115-d may receive the one or more reference signals to estimate and select one or more beam weights for beamformed communications. For example, the UE 115-d may receive one or more CSI-RSs, one or more SRSs, or a combination thereof for beam weight estimation and selection. The UE 115-d may receive the one or more reference signals based on the control signal that allocates the one or more resources for the one or more reference signals. In some examples, the UE 115-d may dynamically perform beam weight estimation based on the one or more reference signals, where the one or more beam weights may be based on the beam weight estimation.

At 625, the UE 115-d may exchange, with the network entity 105-c, signaling for one or more communications. For instance, the network entity 105-c may output, and the UE 115-d may receive, one or more communications (e.g., a downlink signal). Additionally, or alternatively, the UE 115-d may transmit, and the network entity 105-c may obtain, one or more communications (e.g., an uplink signal). In some aspects, the UE 115-d may communicate with the network entity 105-c in accordance with one or more beam weights selected based on the adaptive beam weigh-based hybrid beamforming procedure and the one or more reference signals. In some such aspects, the UE 115-d may communicate using the adaptive beam weight-based hybrid beamforming procedure based on the detected dielectric property, the detected conductivity property, or both. Additionally, or alternatively, communicating with the adaptive beam weight-based hybrid beamforming procedure may be based on the material type. Additionally, or alternatively, communicating using the adaptive beam weight-based hybrid beamforming procedure may be based on a distortion metric of the reflection of the radar waveform that satisfies a distortion threshold.

In some other aspects, the UE 115-d may communicate with the network entity 105-c using a codebook-based hybrid beamforming procedure based on the material type. In some such other aspects, the UE 115-d may select a codebook from a set of multiple codebooks based on the codebook-based hybrid beamforming procedure and the material property for the material. The set of multiple codebooks may indicate different quantities of beam weights, different beam properties, different phase quantization for the beam weights, different amplitude quantization for the beam weights, or any combination thereof. The UE 115-*d* may communicate signaling with the network entity 105-*c* using the selected codebook (e.g., using beam weights from the selected codebook).

Figure 7:
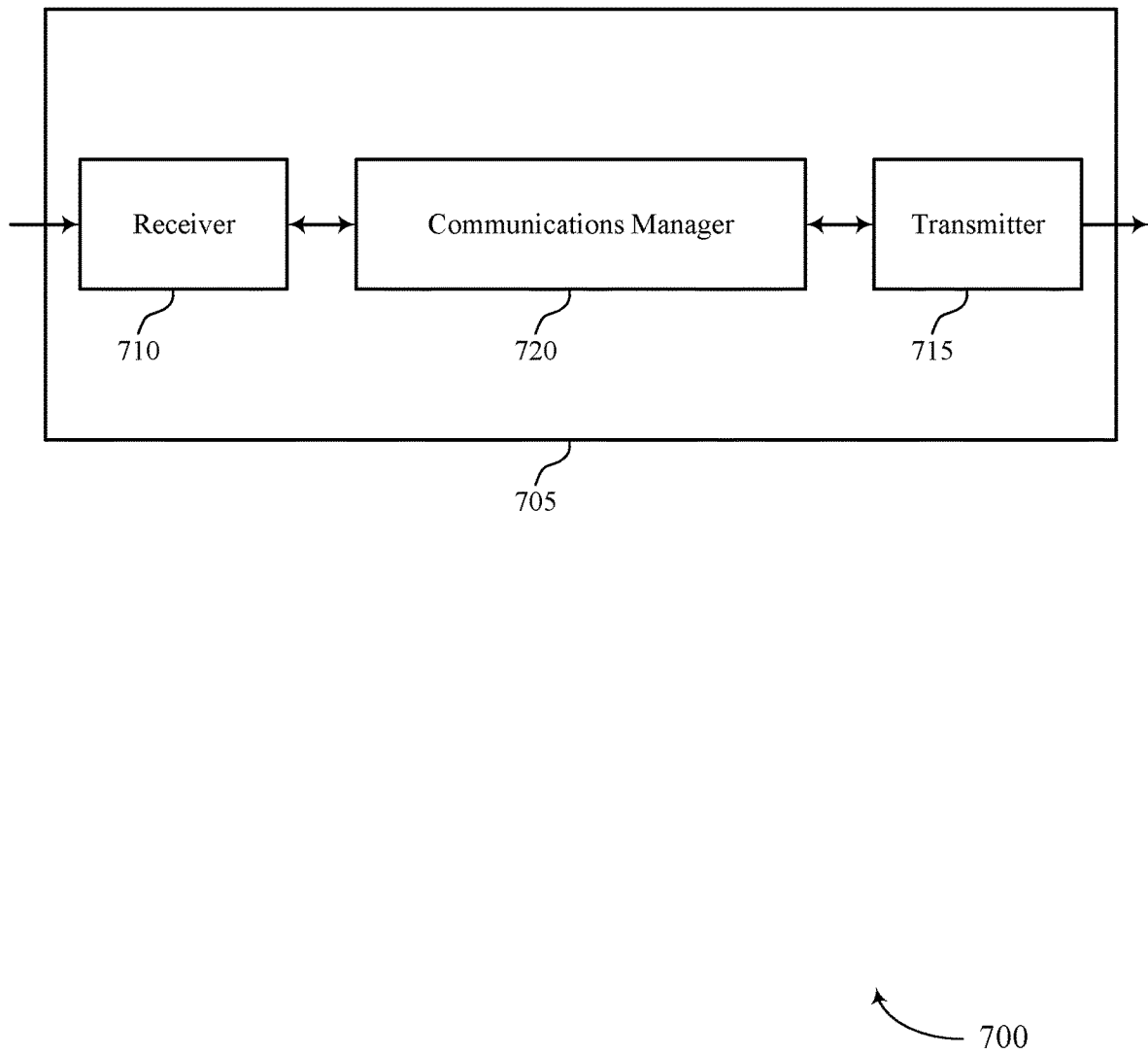
FIGS. 7 and 8 show block diagrams of devices that support techniques for managing an adaptive beam weight-based hybrid beamforming procedure in accordance with one or more aspects of the present disclosure.

FIG. 7 shows a block diagram 700 of a device 705 that supports techniques for managing an adaptive beam weight-based hybrid beamforming procedure in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to switching to an adaptive beam weight-based hybrid beamforming procedure). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to switching to an adaptive beam weight-based hybrid beamforming procedure). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of switching to an adaptive beam weight-based hybrid beamforming procedure as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

Additionally, or alternatively, the communications manager 720 may support wireless communications at a UE in accordance with examples as disclosed herein. For example, the communications manager 720 may be configured as or otherwise support a means for transmitting an indication of a switch from a codebook-based hybrid beamforming procedure to an adaptive beam weight-based hybrid beamforming procedure. The communications manager 720 may be configured as or otherwise support a means for receiving one or more reference signals in response to the indication of the switch to the adaptive beam weight-based hybrid beamforming procedure. The communications manager 720 may be configured as or otherwise support a means for communicating in accordance with one or more beam weights selected based on the adaptive beam weight-based hybrid beamforming procedure and the one or more reference signals.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced processing overhead, reduced power consumption, and more efficient utilization of communication resources. For example, the device 705 may switch to a codebook-based hybrid beamforming procedure to reduce the processing overhead associated with reference signal reception and processing (e.g., for reference signals used for beam weight selection). Additionally, or alternatively, the device 705 may switch to an adaptive beam weight-based hybrid beamforming procedure to reduce the processing overhead associated with retransmissions by improving signal reliability (e.g., by improving the performance of beamformed communications).

Figure 8:
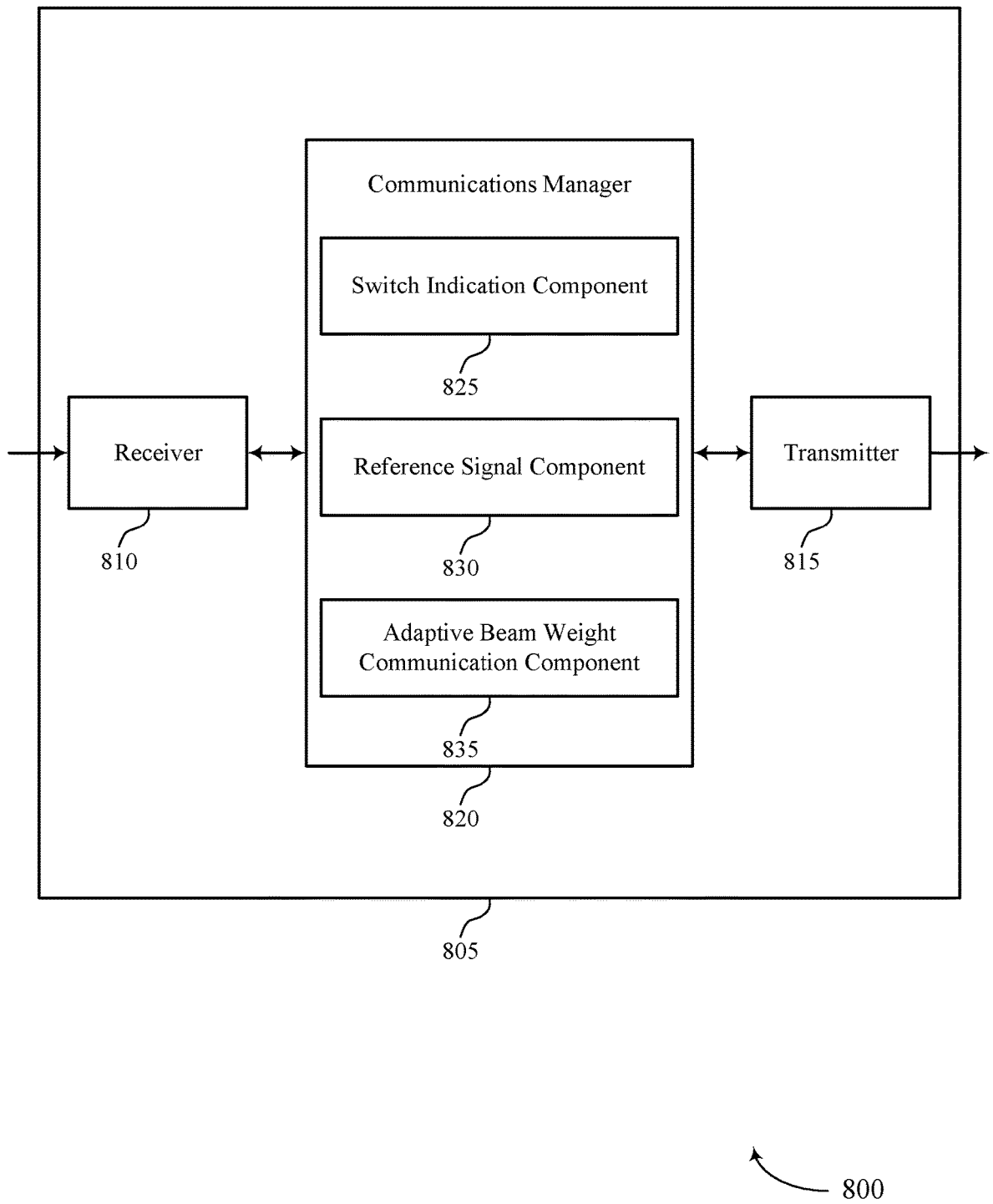

FIG. 8 shows a block diagram 800 of a device 805 that supports techniques for managing an adaptive beam weight-based hybrid beamforming procedure in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to switching to an adaptive beam weight-based hybrid beamforming procedure). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to switching to an adaptive beam weight-based hybrid beamforming procedure). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of switching to an adaptive beam weight-based hybrid beamforming procedure as described herein. For example, the communications manager 820 may include a switch indication component 825, a reference signal component 830, an adaptive beam weight communication component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. The switch indication component 825 may be configured as or otherwise support a means for transmitting an indication of a switch from a codebook-based hybrid beamforming procedure to an adaptive beam weight-based hybrid beamforming procedure. The reference signal component 830 may be configured as or otherwise support a means for receiving one or more reference signals in response to the indication of the switch to the adaptive beam weight-based hybrid beamforming procedure. The adaptive beam weight communication component 835 may be configured as or otherwise support a means for communicating in accordance with one or more beam weights selected based on the adaptive beam weight-based hybrid beamforming procedure and the one or more reference signals.

Figure 9:
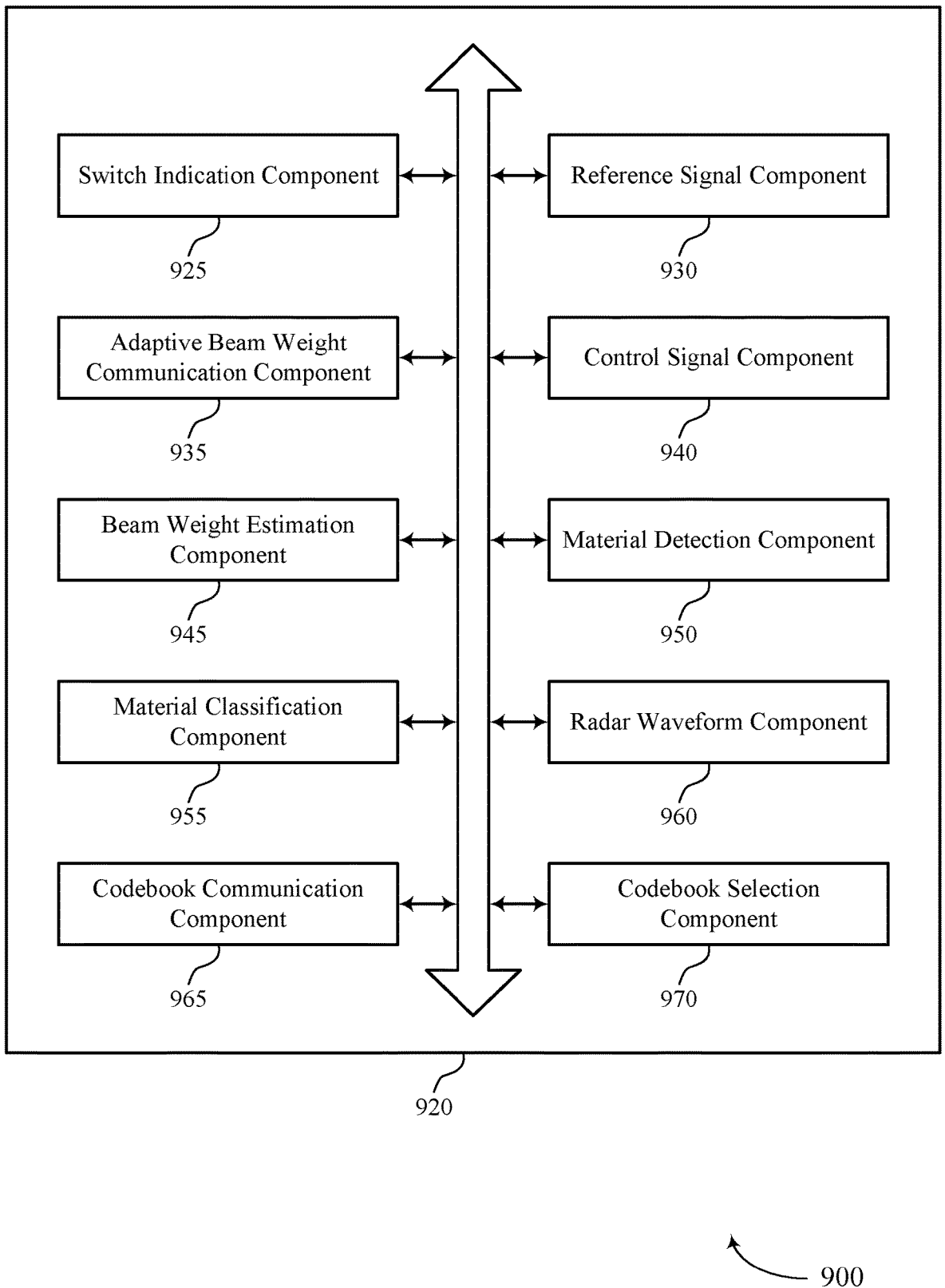
FIG. 9 shows a block diagram of a communications manager that supports techniques for managing an adaptive beam weight-based hybrid beamforming procedure in accordance with one or more aspects of the present disclosure.

FIG. 9 shows a block diagram 900 of a communications manager 920 that supports techniques for managing an adaptive beam weight-based hybrid beamforming procedure in accordance with one or more aspects of the present disclosure. The communications manager 920 may be an example of aspects of a communications manager 720, a communications manager 820, or both, as described herein. The communications manager 920, or various components thereof, may be an example of means for performing various aspects of switching to an adaptive beam weight-based hybrid beamforming procedure as described herein. For example, the communications manager 920 may include a switch indication component 925, a reference signal component 930, an adaptive beam weight communication component 935, a control signal component 940, a beam weight estimation component 945, a material detection component 950, a material classification component 955, a radar waveform component 960, a codebook communication component 965, a codebook selection component 970, or any combination thereof. Each of these components may communicate, directly or indirectly, with one another (e.g., via one or more buses).

The communications manager 920 may support wireless communications at a UE in accordance with examples as disclosed herein. The switch indication component 925 may be configured as or otherwise support a means for transmitting an indication of a switch from a codebook-based hybrid beamforming procedure to an adaptive beam weight-based hybrid beamforming procedure. The reference signal component 930 may be configured as or otherwise support a means for receiving one or more reference signals in response to the indication of the switch to the adaptive beam weight-based hybrid beamforming procedure. The adaptive beam weight communication component 935 may be configured as or otherwise support a means for communicating in accordance with one or more beam weights selected based on the adaptive beam weight-based hybrid beamforming procedure and the one or more reference signals.

In some examples, the control signal component 940 may be configured as or otherwise support a means for receiving, in response to the indication of the switch to the adaptive beam weight-based hybrid beamforming procedure, a control signal that allocates one or more resources for the one or more reference signals, where the one or more reference signals are received based on the control signal.

In some examples, to support receiving the one or more reference signals, the reference signal component 930 may be configured as or otherwise support a means for receiving one or more CSI-RSs, one or more SRSs, or a combination thereof for beam weight estimation and selection.

In some examples, the beam weight estimation component 945 may be configured as or otherwise support a means for dynamically performing beam weight estimation based on the one or more reference signals, where the one or more beam weights are based on the beam weight estimation.

In some examples, the material detection component 950 may be configured as or otherwise support a means for detecting a dielectric property, a conductivity property, or both for a material within a threshold distance from the UE. In some examples, the adaptive beam weight communication component 935 may be configured as or otherwise support a means for communicating using the adaptive beam weight-based hybrid beamforming procedure based on the detected dielectric property, the detected conductivity property, or both.

In some examples, the material classification component 955 may be configured as or otherwise support a means for classifying the material with a material type from a set of multiple material types based on the detected dielectric property, the detected conductivity property, or both, where communicating using the adaptive beam weight-based hybrid beamforming procedure is based on the material type.

In some examples, the material classification component 955 may be configured as or otherwise support a means for receiving assistance information that indicates the set of multiple material types for classification, where the material is classified with the material type based on the assistance information.

In some examples, the radar waveform component 960 may be configured as or otherwise support a means for transmitting a radar waveform. In some examples, the radar waveform component 960 may be configured as or otherwise support a means for receiving, in response to the radar waveform, a reflection of the radar waveform from the material within the threshold distance from the UE, where communicating using the adaptive beam weight-based hybrid beamforming procedure is based on a distortion metric of the reflection of the radar waveform that satisfies a distortion threshold.

In some examples, the material classification component 955 may be configured as or otherwise support a means for inputting one or more waveform parameters of the reflection of the radar waveform into a machine learning model, where the one or more waveform parameters include at least the distortion metric. In some examples, the material classification component 955 may be configured as or otherwise support a means for classifying the material with a material type in accordance with an output of the machine learning model based on the one or more waveform parameters input into the machine learning model.

In some examples, the material detection component 950 may be configured as or otherwise support a means for detecting a second material property for a second material within the threshold distance from the UE. In some examples, the codebook communication component 965 may be configured as or otherwise support a means for communicating using the codebook-based hybrid beamforming procedure based on the second material property for the second material. In some examples, the codebook selection component 970 may be configured as or otherwise support a means for selecting a codebook from a set of multiple codebooks based on the codebook-based hybrid beamforming procedure and the second material property for the second material.

In some examples, the set of multiple codebooks indicates different quantities of beam weights, different beam properties, different phase quantization for the beam weights, different amplitude quantization for the beam weights, or any combination thereof.

Figure 10:
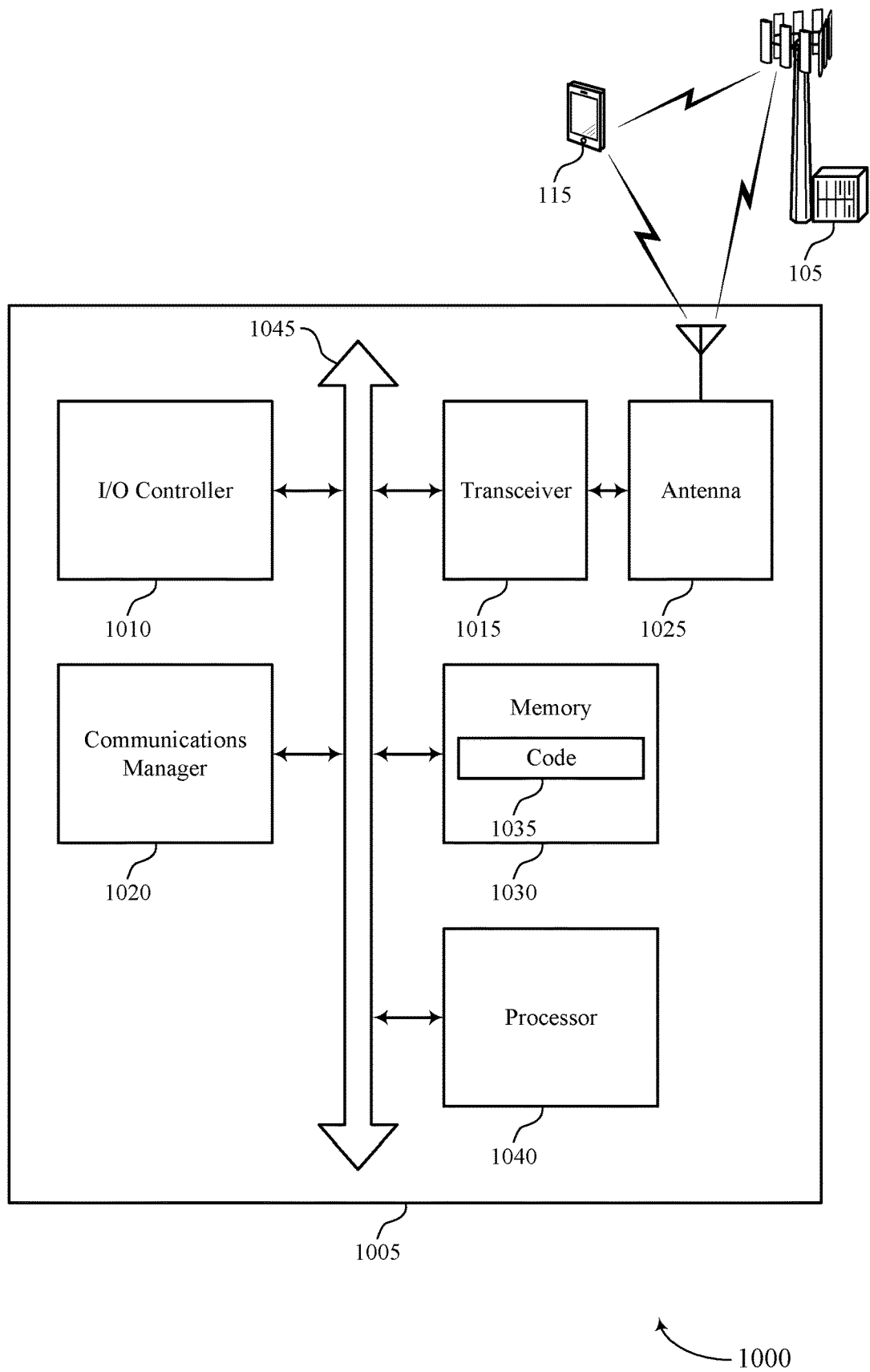
FIG. 10 shows a diagram of a system including a device that supports techniques for managing an adaptive beam weight-based hybrid beamforming procedure in accordance with one or more aspects of the present disclosure.

FIG. 10 shows a diagram of a system 1000 including a device 1005 that supports techniques for managing an adaptive beam weight-based hybrid beamforming procedure in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting switching to an adaptive beam weight-based hybrid beamforming procedure). For example, the device 1005 or a component of the device 1005 may include a processor 1040 and memory 1030 coupled with or to the processor 1040, the processor 1040 and memory 1030 configured to perform various functions described herein.

Additionally, or alternatively, the communications manager 1020 may support wireless communications at a UE in accordance with examples as disclosed herein. For example, the communications manager 1020 may be configured as or otherwise support a means for transmitting an indication of a switch from a codebook-based hybrid beamforming procedure to an adaptive beam weight-based hybrid beamforming procedure. The communications manager 1020 may be configured as or otherwise support a means for receiving one or more reference signals in response to the indication of the switch to the adaptive beam weight-based hybrid beamforming procedure. The communications manager 1020 may be configured as or otherwise support a means for communicating in accordance with one or more beam weights selected based on the adaptive beam weight-based hybrid beamforming procedure and the one or more reference signals.

By including or configuring the communications manager 1020 in accordance with examples as described herein, the device 1005 may support techniques for reduced latency, improved user experience related to reduced processing, reduced power consumption, more efficient utilization of communication resources, longer battery life, and improved utilization of processing capability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of switching to an adaptive beam weight-based hybrid beamforming procedure as described herein, or the processor 1040 and the memory 1030 may be otherwise configured to perform or support such operations.

Figure 11:
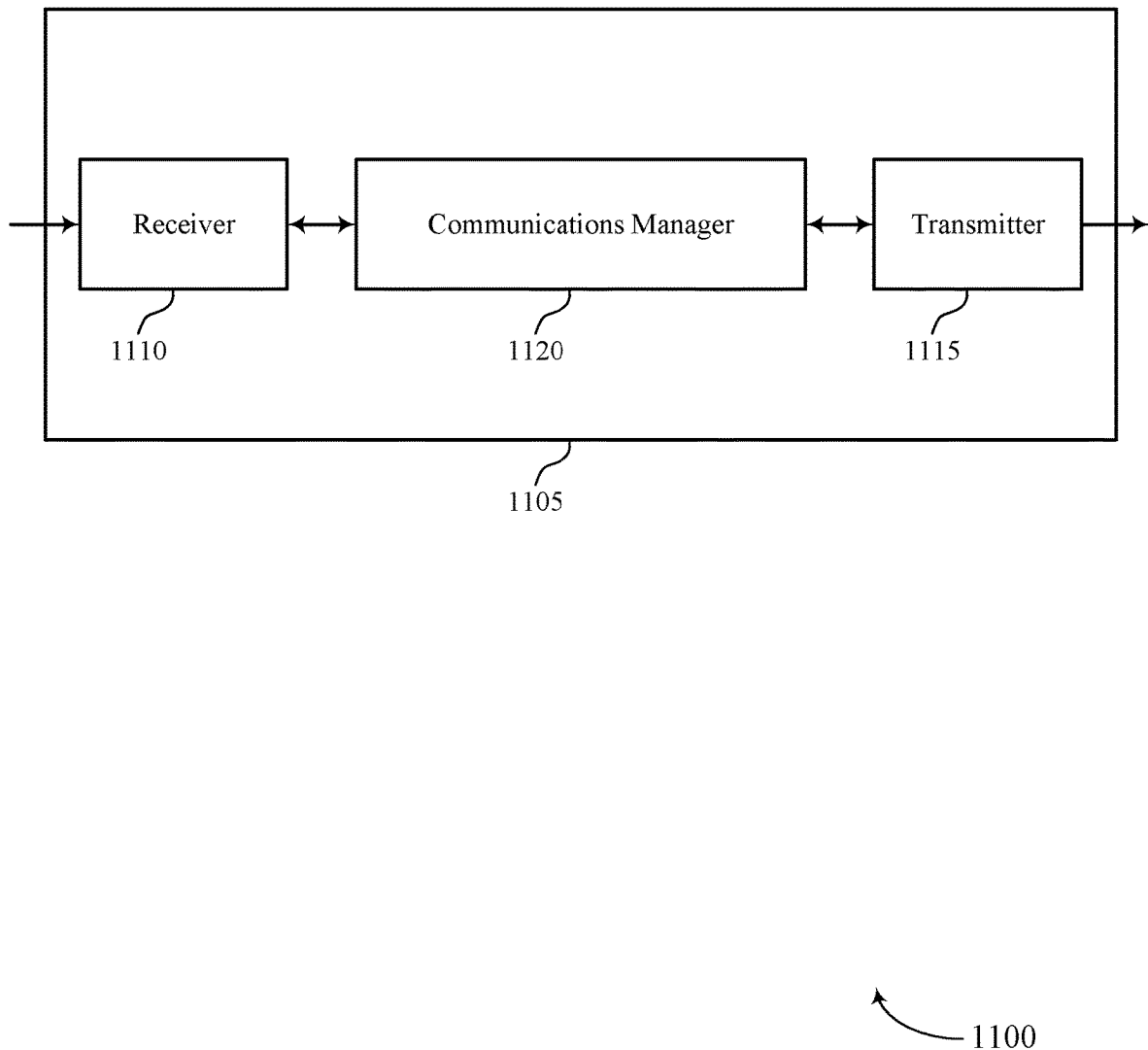
FIGS. 11 and 12 show block diagrams of devices that support techniques for managing an adaptive beam weight-based hybrid beamforming procedure in accordance with one or more aspects of the present disclosure.

FIG. 11 shows a block diagram 1100 of a device 1105 that supports techniques for managing an adaptive beam weight-based hybrid beamforming procedure in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of switching to an adaptive beam weight-based hybrid beamforming procedure as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

Additionally, or alternatively, the communications manager 1120 may support wireless communications in accordance with examples as disclosed herein. For example, the communications manager 1120 may be configured as or otherwise support a means for obtaining an indication of a switch from a codebook-based hybrid beamforming procedure to an adaptive beam weight-based hybrid beamforming procedure for a UE. The communications manager 1120 may be configured as or otherwise support a means for outputting, in response to the indication of the switch to the adaptive beam weight-based hybrid beamforming procedure for the UE, a control signal that allocates one or more resources for one or more reference signals. The communications manager 1120 may be configured as or otherwise support a means for outputting the one or more reference signals associated with the adaptive beam weight-based hybrid beamforming procedure for the UE via the one or more resources based on the control signal.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for reduced processing overhead, reduced power consumption, and more efficient utilization of communication resources.

Figure 12:
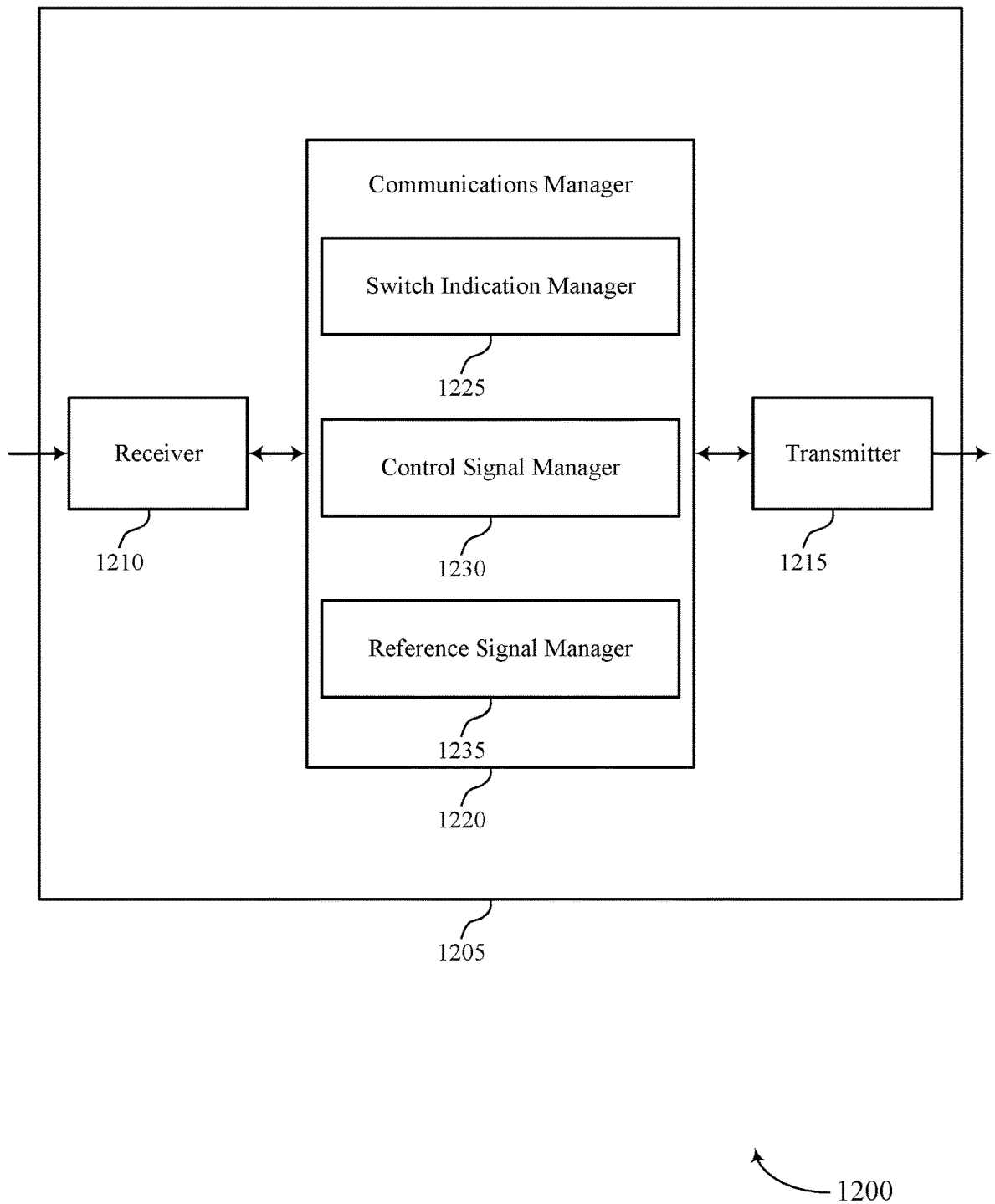

FIG. 12 shows a block diagram 1200 of a device 1205 that supports techniques for managing an adaptive beam weight-based hybrid beamforming procedure in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of switching to an adaptive beam weight-based hybrid beamforming procedure as described herein. For example, the communications manager 1220 may include a switch indication manager 1225, a control signal manager 1230, a reference signal manager 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications in accordance with examples as disclosed herein. The switch indication manager 1225 may be configured as or otherwise support a means for obtaining an indication of a switch from a codebook-based hybrid beamforming procedure to an adaptive beam weight-based hybrid beamforming procedure for a UE. The control signal manager 1230 may be configured as or otherwise support a means for outputting, in response to the indication of the switch to the adaptive beam weight-based hybrid beamforming procedure for the UE, a control signal that allocates one or more resources for one or more reference signals. The reference signal manager 1235 may be configured as or otherwise support a means for outputting the one or more reference signals associated with the adaptive beam weight-based hybrid beamforming procedure for the UE via the one or more resources based on the control signal.

Figure 13:
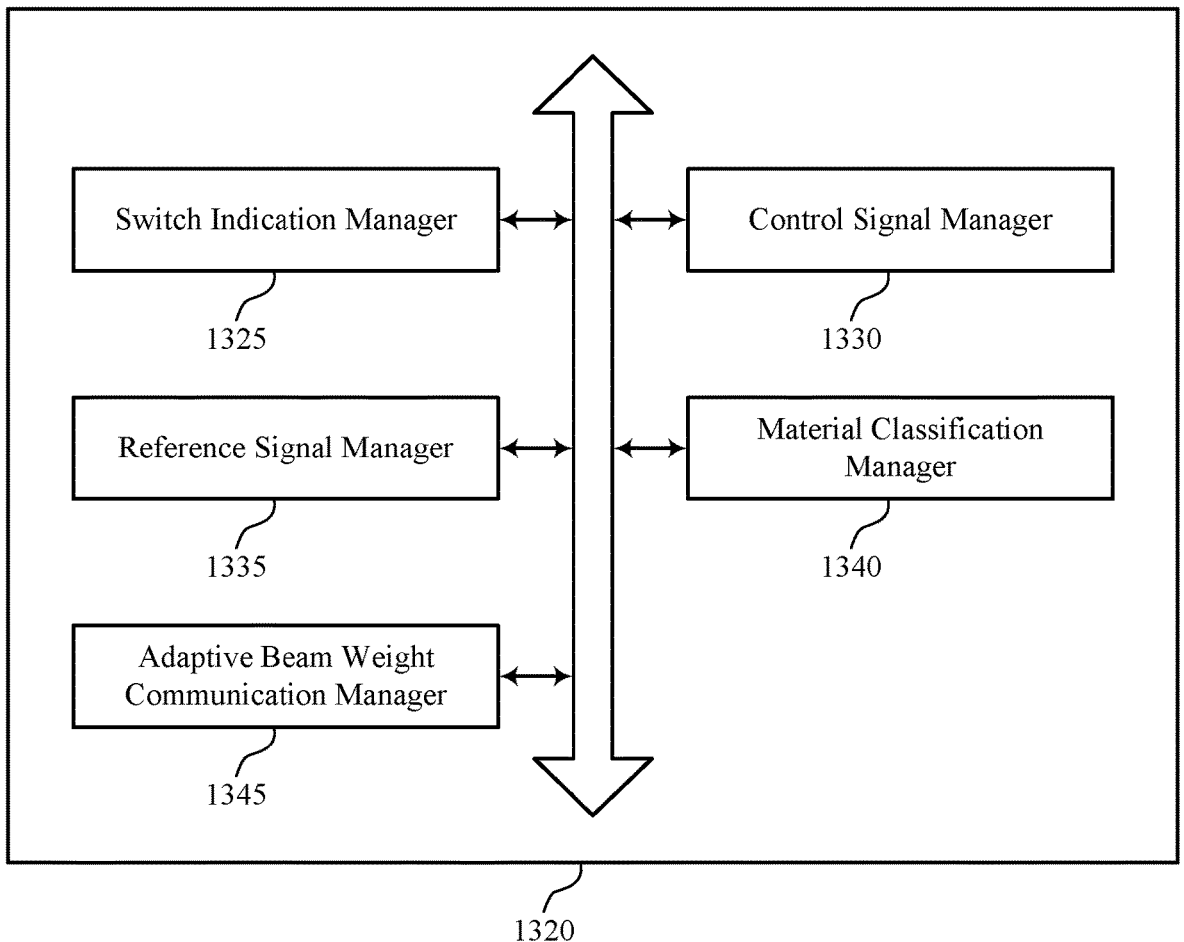
FIG. 13 shows a block diagram of a communications manager that supports techniques for managing an adaptive beam weight-based hybrid beamforming procedure in accordance with one or more aspects of the present disclosure.

FIG. 13 shows a block diagram 1300 of a communications manager 1320 that supports techniques for managing an adaptive beam weight-based hybrid beamforming procedure in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of switching to an adaptive beam weight-based hybrid beamforming procedure as described herein. For example, the communications manager 1320 may include a switch indication manager 1325, a control signal manager 1330, a reference signal manager 1335, a material classification manager 1340, an adaptive beam weight communication manager 1345, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

Additionally, or alternatively, the communications manager 1320 may support wireless communications in accordance with examples as disclosed herein. The switch indication manager 1325 may be configured as or otherwise support a means for obtaining an indication of a switch from a codebook-based hybrid beamforming procedure to an adaptive beam weight-based hybrid beamforming procedure for a UE. The control signal manager 1330 may be configured as or otherwise support a means for outputting, in response to the indication of the switch to the adaptive beam weight-based hybrid beamforming procedure for the UE, a control signal that allocates one or more resources for one or more reference signals. The reference signal manager 1335 may be configured as or otherwise support a means for outputting the one or more reference signals associated with the adaptive beam weight-based hybrid beamforming procedure for the UE via the one or more resources based on the control signal.

In some examples, the material classification manager 1340 may be configured as or otherwise support a means for outputting assistance information that indicates a set of multiple material types for classification, where the indication of the switch to the adaptive beam weight-based hybrid beamforming procedure for the UE is based on the set of multiple material types for classification.

In some examples, the adaptive beam weight communication manager 1345 may be configured as or otherwise support a means for obtaining or outputting one or more communications based on the one or more reference signals associated with the adaptive beam weight-based hybrid beamforming procedure for the UE.

In some examples, to support outputting the one or more reference signals, the reference signal manager 1335 may be configured as or otherwise support a means for outputting one or more CSI-RSs, one or more SRSs, or a combination thereof for beam weight estimation and selection.

Figure 14:
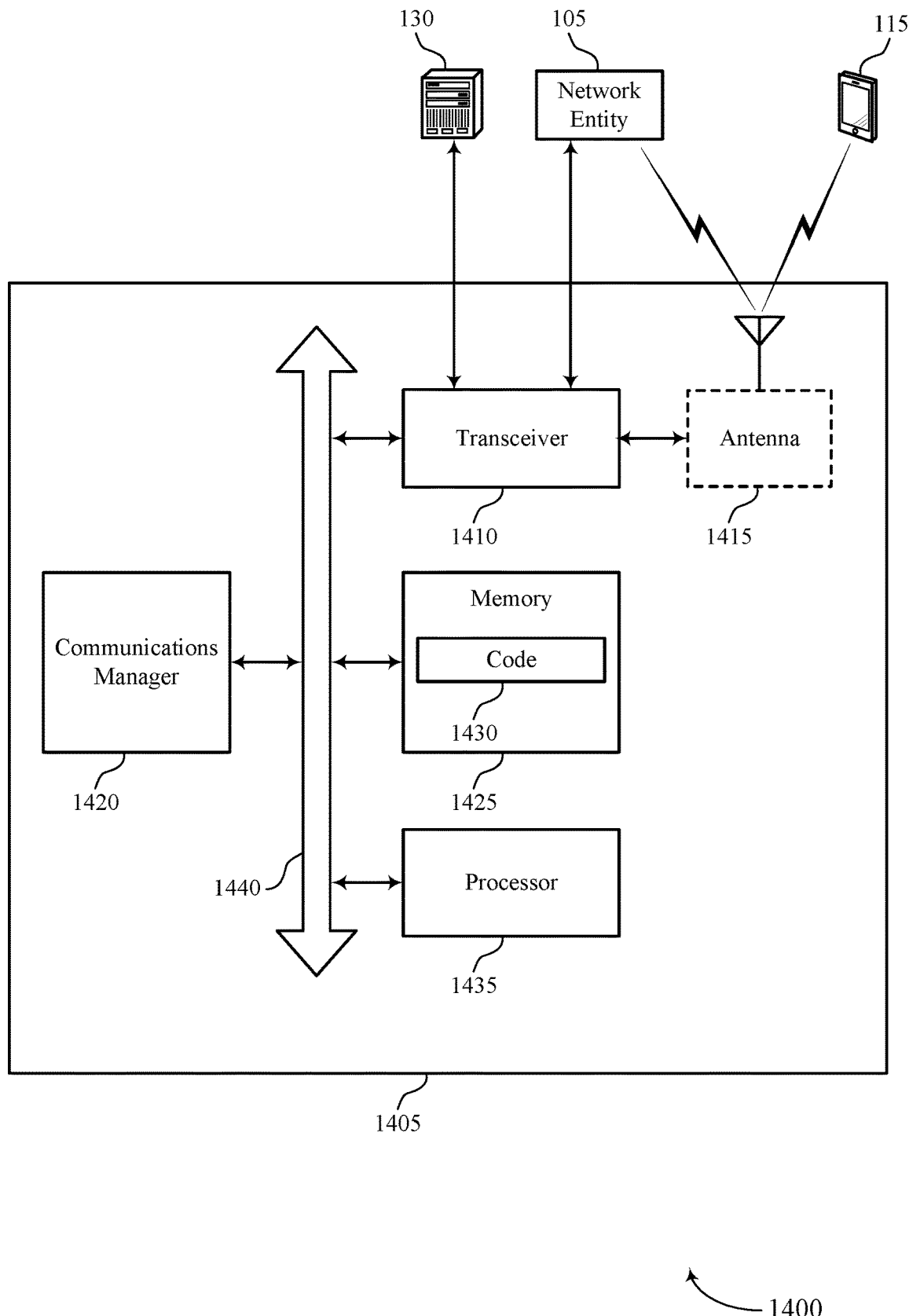
FIG. 14 shows a diagram of a system including a device that supports techniques for managing an adaptive beam weight-based hybrid beamforming procedure in accordance with one or more aspects of the present disclosure.

FIG. 14 shows a diagram of a system 1400 including a device 1405 that supports techniques for managing an adaptive beam weight-based hybrid beamforming procedure in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. The transceiver 1410, or the transceiver 1410 and one or more antennas 1415 or wired interfaces, where applicable, may be an example of a transmitter 1115, a transmitter 1215, a receiver 1110, a receiver 1210, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting switching to an adaptive beam weight-based hybrid beamforming procedure). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1405 may transmit information output from the chip or modem. In some implementations, the second interface may refer to an interface between the processing system of the chip or modem and a receiver, such that the device 1405 may obtain information or signal inputs, and the information may be passed to the processing system. A person having ordinary skill in the art will readily recognize that the first interface also may obtain information or signal inputs, and the second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

Additionally, or alternatively, the communications manager 1420 may support wireless communications in accordance with examples as disclosed herein. For example, the communications manager 1420 may be configured as or otherwise support a means for obtaining an indication of a switch from a codebook-based hybrid beamforming procedure to an adaptive beam weight-based hybrid beamforming procedure for a UE. The communications manager 1420 may be configured as or otherwise support a means for outputting, in response to the indication of the switch to the adaptive beam weight-based hybrid beamforming procedure for the UE, a control signal that allocates one or more resources for one or more reference signals. The communications manager 1420 may be configured as or otherwise support a means for outputting the one or more reference signals associated with the adaptive beam weight-based hybrid beamforming procedure for the UE via the one or more resources based on the control signal.

By including or configuring the communications manager 1420 in accordance with examples as described herein, the device 1405 may support techniques for reduced latency, improved user experience related to reduced processing, reduced power consumption, more efficient utilization of communication resources, longer battery life, and improved utilization of processing capability.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the processor 1435, the memory 1425, the code 1430, the transceiver 1410, or any combination thereof. For example, the code 1430 may include instructions executable by the processor 1435 to cause the device 1405 to perform various aspects of switching to an adaptive beam weight-based hybrid beamforming procedure as described herein, or the processor 1435 and the memory 1425 may be otherwise configured to perform or support such operations.

Figure 15:
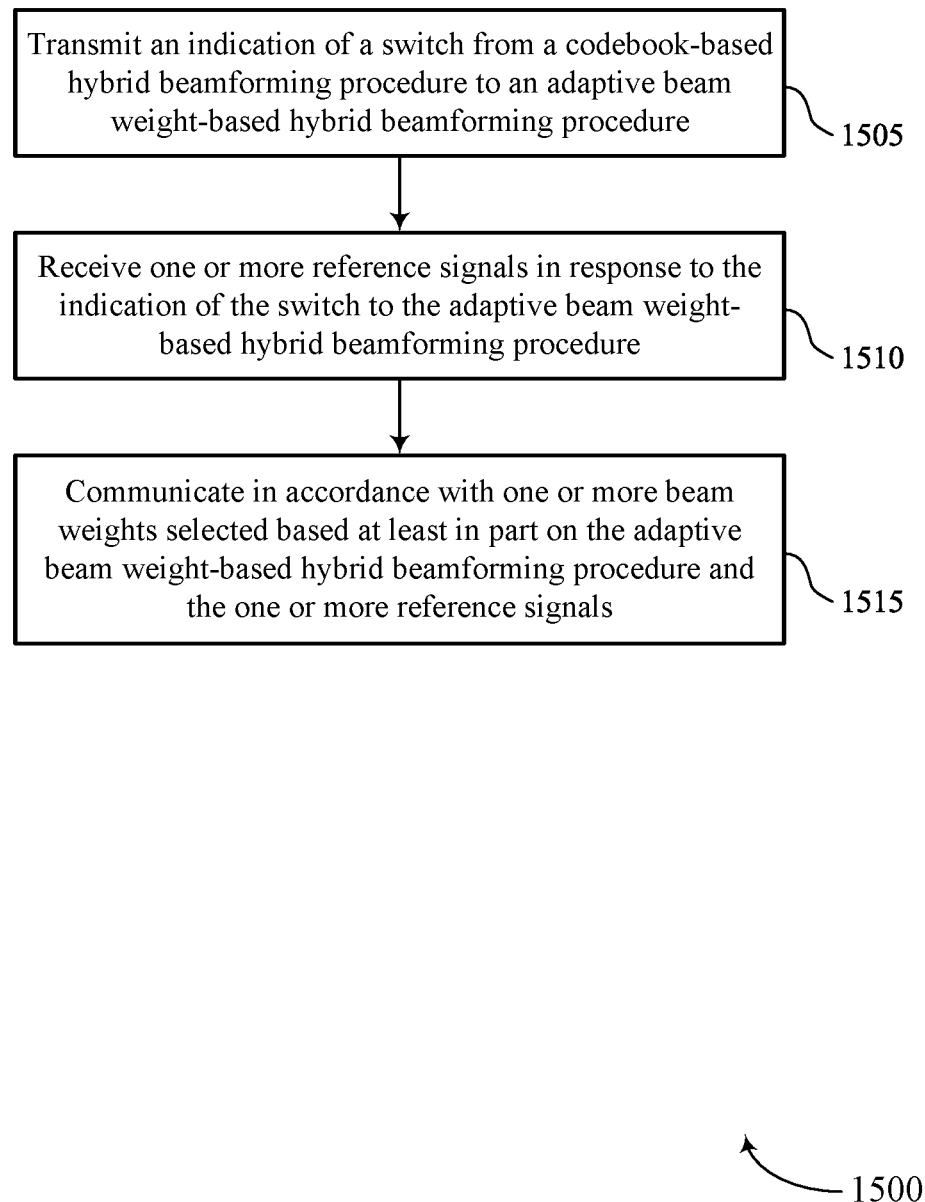
FIGS. 15 through 18 show flowcharts illustrating methods that support techniques for managing an adaptive beam weight-based hybrid beamforming procedure in accordance with one or more aspects of the present disclosure.

FIG. 15 shows a flowchart illustrating a method 1500 that supports techniques for managing an adaptive beam weight-based hybrid beamforming procedure in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include transmitting an indication of a switch from a codebook-based hybrid beamforming procedure to an adaptive beam weight-based hybrid beamforming procedure. The operations of 1505 may be performed in accordance with examples as disclosed herein. In some examples, aspects of the operations of 1505 may be performed by a switch indication component 925 as described with reference to FIG. 9.

At 1510, the method may include receiving one or more reference signals in response to the indication of the switch to the adaptive beam weight-based hybrid beamforming procedure. The operations of 1510 may be performed in accordance with examples as disclosed herein. In some examples, aspects of the operations of 1510 may be performed by a reference signal component 930 as described with reference to FIG. 9.

At 1515, the method may include communicating in accordance with one or more beam weights selected based on the adaptive beam weight-based hybrid beamforming procedure and the one or more reference signals. The operations of 1515 may be performed in accordance with examples as disclosed herein. In some examples, aspects of the operations of 1515 may be performed by an adaptive beam weight communication component 935 as described with reference to FIG. 9.

Figure 16:
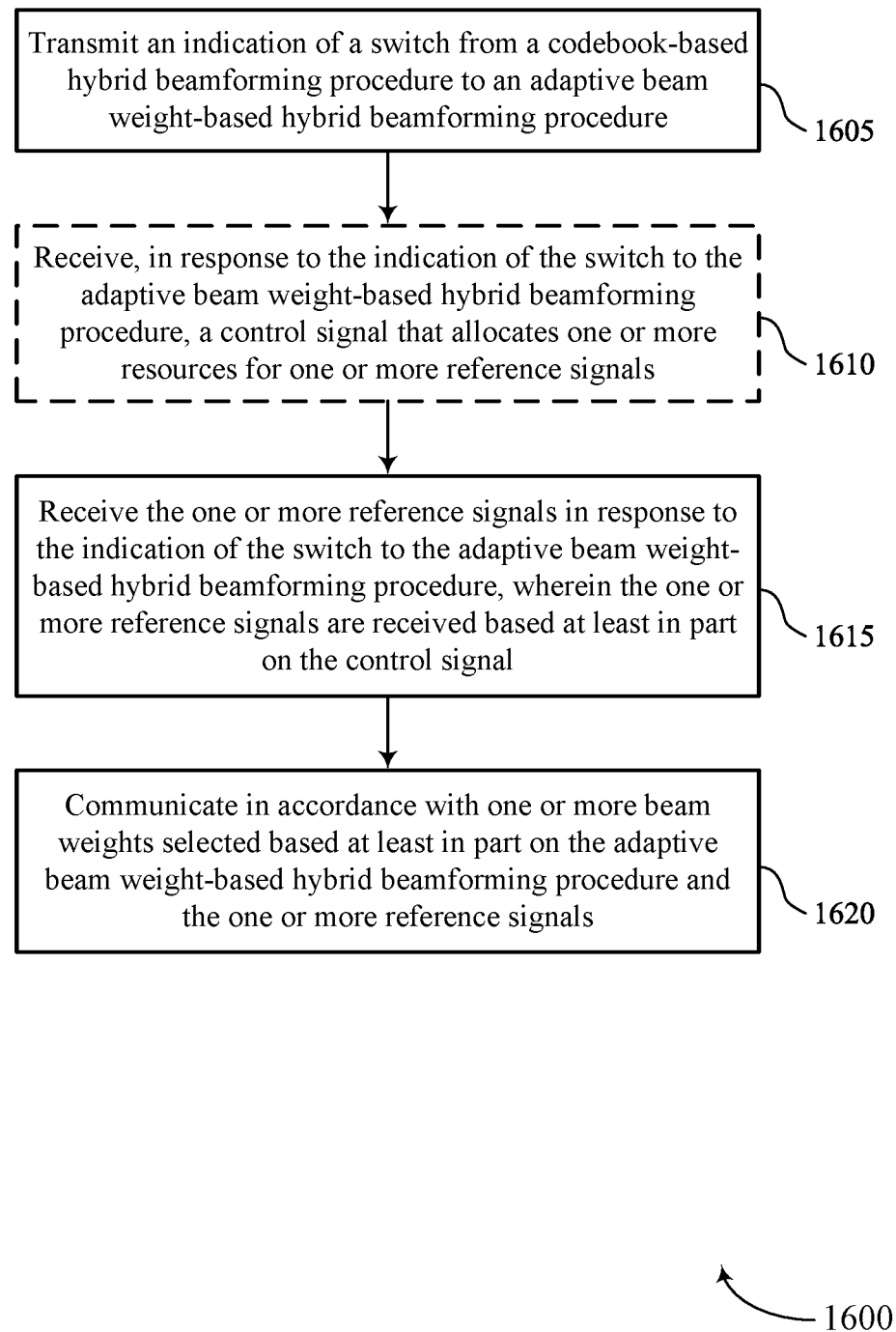

FIG. 16 shows a flowchart illustrating a method 1600 that supports techniques for managing an adaptive beam weight-based hybrid beamforming procedure in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include transmitting an indication of a switch from a codebook-based hybrid beamforming procedure to an adaptive beam weight-based hybrid beamforming procedure. The operations of 1605 may be performed in accordance with examples as disclosed herein. In some examples, aspects of the operations of 1605 may be performed by a switch indication component 925 as described with reference to FIG. 9.

At 1610, the method may include receiving, in response to the indication of the switch to the adaptive beam weight-based hybrid beamforming procedure, a control signal that allocates one or more resources for one or more reference signals. The operations of 1610 may be performed in accordance with examples as disclosed herein. In some examples, aspects of the operations of 1610 may be performed by a control signal component 940 as described with reference to FIG. 9.

At 1615, the method may include receiving the one or more reference signals in response to the indication of the switch to the adaptive beam weight-based hybrid beamforming procedure, where the one or more reference signals are received based on the control signal. The operations of 1615 may be performed in accordance with examples as disclosed herein. In some examples, aspects of the operations of 1615 may be performed by a reference signal component 930 as described with reference to FIG. 9.

At 1620, the method may include communicating in accordance with one or more beam weights selected based on the adaptive beam weight-based hybrid beamforming procedure and the one or more reference signals. The operations of 1620 may be performed in accordance with examples as disclosed herein. In some examples, aspects of the operations of 1620 may be performed by an adaptive beam weight communication component 935 as described with reference to FIG. 9.

Figure 17:
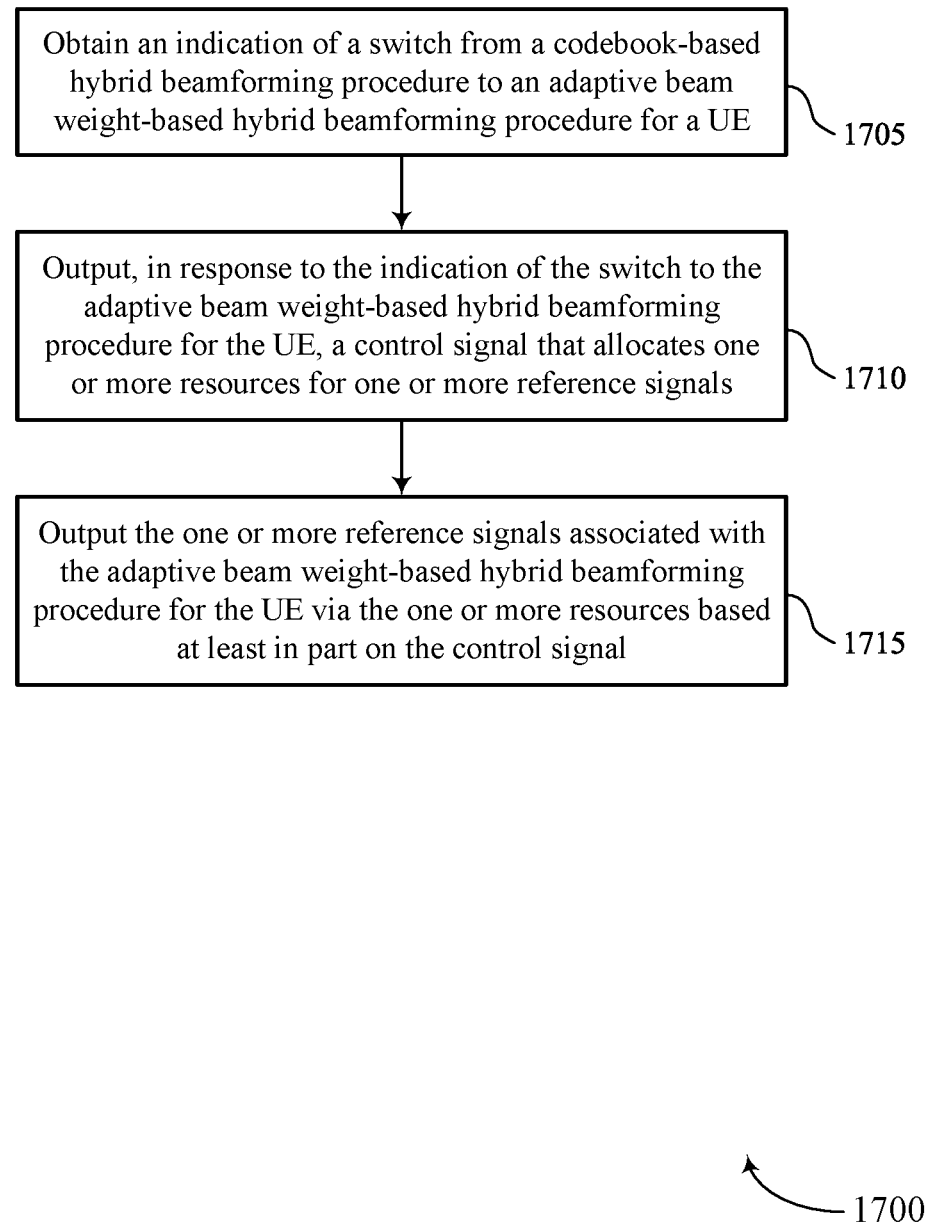

FIG. 17 shows a flowchart illustrating a method 1700 that supports techniques for managing an adaptive beam weight-based hybrid beamforming procedure in accordance with one or more aspects of the present disclosure. The operations of the method 1700 may be implemented by a network entity or its components as described herein. For example, the operations of the method 1700 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1705, the method may include obtaining an indication of a switch from a codebook-based hybrid beamforming procedure to an adaptive beam weight-based hybrid beamforming procedure for a UE. The operations of 1705 may be performed in accordance with examples as disclosed herein. In some examples, aspects of the operations of 1705 may be performed by a switch indication manager 1325 as described with reference to FIG. 13.

At 1710, the method may include outputting, in response to the indication of the switch to the adaptive beam weight-based hybrid beamforming procedure for the UE, a control signal that allocates one or more resources for one or more reference signals. The operations of 1710 may be performed in accordance with examples as disclosed herein. In some examples, aspects of the operations of 1710 may be performed by a control signal manager 1330 as described with reference to FIG. 13.

At 1715, the method may include outputting the one or more reference signals associated with the adaptive beam weight-based hybrid beamforming procedure for the UE via the one or more resources based on the control signal. The operations of 1715 may be performed in accordance with examples as disclosed herein. In some examples, aspects of the operations of 1715 may be performed by a reference signal manager 1335 as described with reference to FIG. 13.

Figure 18:
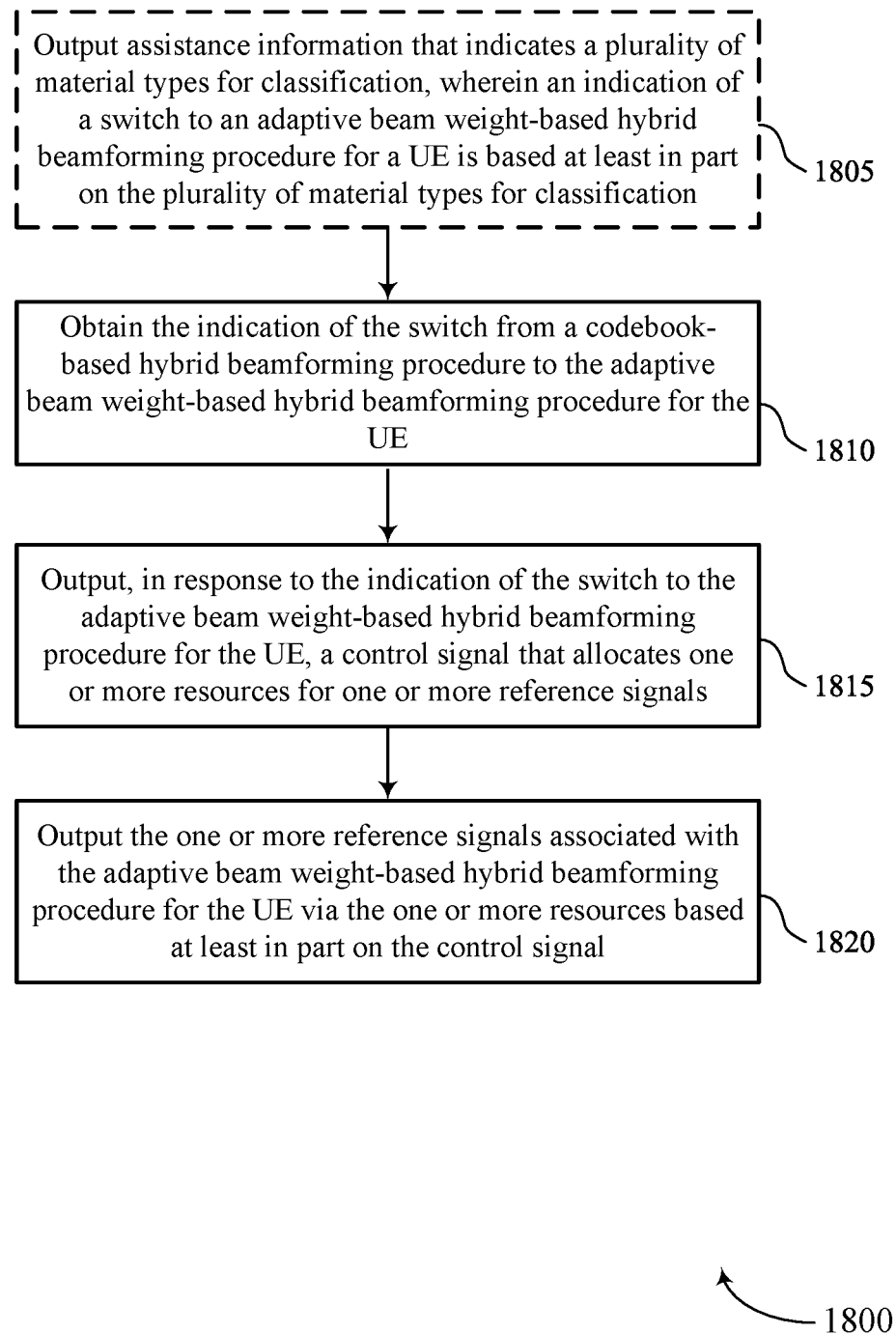

FIG. 18 shows a flowchart illustrating a method 1800 that supports techniques for managing an adaptive beam weight-based hybrid beamforming procedure in accordance with one or more aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include outputting assistance information that indicates a set of multiple material types for classification, where an indication of a switch to an adaptive beam weight-based hybrid beamforming procedure for a UE is based on the set of multiple material types for classification. The operations of 1805 may be performed in accordance with examples as disclosed herein. In some examples, aspects of the operations of 1805 may be performed by a material classification manager 1340 as described with reference to FIG. 13.

At 1810, the method may include obtaining the indication of the switch from a codebook-based hybrid beamforming procedure to the adaptive beam weight-based hybrid beamforming procedure for the UE. The operations of 1810 may be performed in accordance with examples as disclosed herein. In some examples, aspects of the operations of 1810 may be performed by a switch indication manager 1325 as described with reference to FIG. 13.

At 1815, the method may include outputting, in response to the indication of the switch to the adaptive beam weight-based hybrid beamforming procedure for the UE, a control signal that allocates one or more resources for one or more reference signals. The operations of 1815 may be performed in accordance with examples as disclosed herein. In some examples, aspects of the operations of 1815 may be performed by a control signal manager 1330 as described with reference to FIG. 13.

At 1820, the method may include outputting the one or more reference signals associated with the adaptive beam weight-based hybrid beamforming procedure for the UE via the one or more resources based on the control signal. The operations of 1820 may be performed in accordance with examples as disclosed herein. In some examples, aspects of the operations of 1820 may be performed by a reference signal manager 1335 as described with reference to FIG. 13.

The following provides an overview of aspects of the present disclosure:

Aspect 1: An apparatus for wireless communications at a UE, comprising: a processor; and memory coupled with the processor, the processor configured to: transmit an indication of a switch from a codebook-based hybrid beamforming procedure to an adaptive beam weight-based hybrid beamforming procedure; receive one or more reference signals in response to the indication of the switch to the adaptive beam weight-based hybrid beamforming procedure; and communicate in accordance with one or more beam weights selected based at least in part on the adaptive beam weight-based hybrid beamforming procedure and the one or more reference signals.

Aspect 2: The apparatus of aspect 1, wherein the processor is further configured to: receive, in response to the indication of the switch to the adaptive beam weight-based hybrid beamforming procedure, a control signal that allocates one or more resources for the one or more reference signals, wherein the one or more reference signals are received based at least in part on the control signal.

Aspect 3: The apparatus of aspect 2, wherein the processor configured to receive the one or more reference signals is configured to: receive one or more CSI-RSs, one or more SRSs, or a combination thereof for beam weight estimation and selection.

Aspect 4: The apparatus of any of aspects 1 through 3, wherein the processor is further configured to: dynamically perform beam weight estimation based at least in part on the one or more reference signals, wherein the one or more beam weights are based at least in part on the beam weight estimation.

Aspect 5: The apparatus of any of aspects 1 through 4, wherein the processor is further configured to: detect a dielectric property, a conductivity property, or both for a material within a threshold distance from the UE; and communicate using the adaptive beam weight-based hybrid beamforming procedure based at least in part on the detected dielectric property, the detected conductivity property, or both.

Aspect 6: The apparatus of aspect 5, wherein the processor is further configured to: classify the material with a material type from a plurality of material types based at least in part on the detected dielectric property, the detected conductivity property, or both, wherein communicating using the adaptive beam weight-based hybrid beamforming procedure is based at least in part on the material type.

Aspect 7: The apparatus of aspect 6, wherein the processor is further configured to: receive assistance information that indicates the plurality of material types for classification, wherein the material is classified with the material type based at least in part on the assistance information.

Aspect 8: The apparatus of any of aspects 5 through 7, wherein the processor is further configured to: transmit a radar waveform; and receive, in response to the radar waveform, a reflection of the radar waveform from the material within the threshold distance from the UE, wherein communicating using the adaptive beam weight-based hybrid beamforming procedure is based at least in part on a distortion metric of the reflection of the radar waveform that satisfies a distortion threshold.

Aspect 9: The apparatus of aspect 8, wherein the processor is further configured to: input one or more waveform parameters of the reflection of the radar waveform into a machine learning model, wherein the one or more waveform parameters comprise at least the distortion metric; and classify the material with a material type in accordance with an output of the machine learning model based at least in part on the one or more waveform parameters input into the machine learning model.

Aspect 10: The apparatus of any of aspects 5 through 9, wherein the processor is further configured to: detect a second material property for a second material within the threshold distance from the UE; communicate using the codebook-based hybrid beamforming procedure based at least in part on the second material property for the second material; and select a codebook from a plurality of codebooks based at least in part on the codebook-based hybrid beamforming procedure and the second material property for the second material.

Aspect 11: The apparatus of aspect 10, wherein the plurality of codebooks indicates different quantities of beam weights, different beam properties, different phase quantization for the beam weights, different amplitude quantization for the beam weights, or any combination thereof.

Aspect 12: An apparatus for wireless communications, comprising: a processor; and memory coupled with the processor, the processor configured to: obtain an indication of a switch from a codebook-based hybrid beamforming procedure to an adaptive beam weight-based hybrid beamforming procedure for a UE; output, in response to the indication of the switch to the adaptive beam weight-based hybrid beamforming procedure for the UE, a control signal that allocates one or more resources for one or more reference signals; and output the one or more reference signals associated with the adaptive beam weight-based hybrid beamforming procedure for the UE via the one or more resources based at least in part on the control signal.

Aspect 13: The apparatus of aspect 12, wherein the processor is further configured to: output assistance information that indicates a plurality of material types for classification, wherein the indication of the switch to the adaptive beam weight-based hybrid beamforming procedure for the UE is based at least in part on the plurality of material types for classification.

Aspect 14: The apparatus of any of aspects 12 through 13, wherein the processor is further configured to: obtain or output one or more communications based at least in part on the one or more reference signals associated with the adaptive beam weight-based hybrid beamforming procedure for the UE.

Aspect 15: The apparatus of any of aspects 12 through 14, wherein the processor configured to output the one or more reference signals is configured to: output one or more CSI-RSs, one or more SRSs, or a combination thereof for beam weight estimation and selection.

Aspect 16: A method for wireless communications at a UE, comprising: transmitting an indication of a switch from a codebook-based hybrid beamforming procedure to an adaptive beam weight-based hybrid beamforming procedure; receiving one or more reference signals in response to the indication of the switch to the adaptive beam weight-based hybrid beamforming procedure; and communicating in accordance with one or more beam weights selected based at least in part on the adaptive beam weight-based hybrid beamforming procedure and the one or more reference signals.

Aspect 17: The method of aspect 16, further comprising: receiving, in response to the indication of the switch to the adaptive beam weight-based hybrid beamforming procedure, a control signal that allocates one or more resources for the one or more reference signals, wherein the one or more reference signals are received based at least in part on the control signal.

Aspect 18: The method of aspect 17, wherein receiving the one or more reference signals comprises: receiving one or more CSI-RSs, one or more SRSs, or a combination thereof for beam weight estimation and selection.

Aspect 19: The method of any of aspects 16 through 18, further comprising: dynamically performing beam weight estimation based at least in part on the one or more reference signals, wherein the one or more beam weights are based at least in part on the beam weight estimation.

Aspect 20: The method of any of aspects 16 through 19, further comprising: detecting a dielectric property, a conductivity property, or both for a material within a threshold distance from the UE; and communicating using the adaptive beam weight-based hybrid beamforming procedure based at least in part on the detected dielectric property, the detected conductivity property, or both.

Aspect 21: The method of aspect 20, further comprising: classifying the material with a material type from a plurality of material types based at least in part on the detected dielectric property, the detected conductivity property, or both, wherein communicating using the adaptive beam weight-based hybrid beamforming procedure is based at least in part on the material type.

Aspect 22: The method of aspect 21, further comprising: receiving assistance information that indicates the plurality of material types for classification, wherein the material is classified with the material type based at least in part on the assistance information.

Aspect 23: The method of any of aspects 20 through 22, further comprising: transmitting a radar waveform; and receiving, in response to the radar waveform, a reflection of the radar waveform from the material within the threshold distance from the UE, wherein communicating using the adaptive beam weight-based hybrid beamforming procedure is based at least in part on a distortion metric of the reflection of the radar waveform that satisfies a distortion threshold.

Aspect 24: The method of aspect 23, further comprising: inputting one or more waveform parameters of the reflection of the radar waveform into a machine learning model, wherein the one or more waveform parameters comprise at least the distortion metric; and classifying the material with a material type in accordance with an output of the machine learning model based at least in part on the one or more waveform parameters input into the machine learning model.

Aspect 25: The method of any of aspects 20 through 24, further comprising: detecting a second material property for a second material within the threshold distance from the UE; communicating using the codebook-based hybrid beamforming procedure based at least in part on the second material property for the second material; and selecting a codebook from a plurality of codebooks based at least in part on the codebook-based hybrid beamforming procedure and the second material property for the second material.

Aspect 26: The method of aspect 25, wherein the plurality of codebooks indicates different quantities of beam weights, different beam properties, different phase quantization for the beam weights, different amplitude quantization for the beam weights, or any combination thereof.

Aspect 27: A method for wireless communications, comprising: obtaining an indication of a switch from a codebook-based hybrid beamforming procedure to an adaptive beam weight-based hybrid beamforming procedure for a UE; outputting, in response to the indication of the switch to the adaptive beam weight-based hybrid beamforming procedure for the UE, a control signal that allocates one or more resources for one or more reference signals; and outputting the one or more reference signals associated with the adaptive beam weight-based hybrid beamforming procedure for the UE via the one or more resources based at least in part on the control signal.

Aspect 28: The method of aspect 27, further comprising: outputting assistance information that indicates a plurality of material types for classification, wherein the indication of the switch to the adaptive beam weight-based hybrid beamforming procedure for the UE is based at least in part on the plurality of material types for classification.

Aspect 29: The method of any of aspects 27 through 28, further comprising: obtaining or outputting one or more communications based at least in part on the one or more reference signals associated with the adaptive beam weight-based hybrid beamforming procedure for the UE.

Aspect 30: The method of any of aspects 27 through 29, wherein outputting the one or more reference signals comprises: outputting one or more CSI-RSs, one or more SRSs, or a combination thereof for beam weight estimation and selection.

Aspect 31: An apparatus for wireless communications at a UE, comprising at least one means for performing a method of any of aspects 16 through 26.

Aspect 32: A non-transitory computer-readable medium storing code for wireless communications at a UE, the code comprising instructions executable by a processor to perform a method of any of aspects 16 through 26.

Aspect 33: An apparatus for wireless communications, comprising at least one means for performing a method of any of aspects 27 through 30.

Aspect 34: A non-transitory computer-readable medium storing code, the code comprising instructions executable by a processor to perform a method of any of aspects 27 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   one or more memories; and
   one or more processors coupled with the one or more memories and configured to cause the UE to:
      transmit an indication of a switch from a codebook-based hybrid beamforming procedure to an adaptive beam weight-based hybrid beamforming procedure at the UE;
      receive one or more reference signals in response to the indication of the switch to the adaptive beam weight-based hybrid beamforming procedure; and
      communicate in accordance with one or more beam weights selected based at least in part on the adaptive beam weight-based hybrid beamforming procedure and the one or more reference signals.

2. The apparatus of claim 1, wherein the one or more processors are further configured to cause the UE to:
   receive, in response to the indication of the switch to the adaptive beam weight-based hybrid beamforming procedure, a control signal that allocates one or more resources for the one or more reference signals, wherein the one or more reference signals are received based at least in part on the control signal.

3. The apparatus of claim 2, wherein, to receive the one or more reference signals, the one or more processors are configured to cause the UE to:
   receive one or more channel state information reference signals (CSI-RSs), one or more sounding reference signals (SRSs), or a combination thereof for beam weight estimation and selection.

4. The apparatus of claim 1, wherein the one or more processors are further configured to cause the UE to:

dynamically perform beam weight estimation based at least in part on the one or more reference signals, wherein the one or more beam weights are based at least in part on the beam weight estimation.

5. The apparatus of claim 1, wherein the one or more processors are further configured to cause the UE to:
detect a dielectric property, a conductivity property, or both for a material within a threshold distance from the UE; and
communicate in accordance with the adaptive beam weight-based hybrid beamforming procedure based at least in part on the detected dielectric property, the detected conductivity property, or both.

6. The apparatus of claim 5, wherein the one or more processors are further configured to cause the UE to:
classify the material with a material type from a plurality of material types based at least in part on the detected dielectric property, the detected conductivity property, or both, wherein the communication in accordance with the adaptive beam weight-based hybrid beamforming procedure is based at least in part on the material type.

7. The apparatus of claim 6, wherein the one or more processors are further configured to cause the UE to:
receive assistance information that indicates the plurality of material types for classification, wherein the material is classified with the material type based at least in part on the assistance information.

8. The apparatus of claim 5, wherein the one or more processors are further configured to cause the UE to:
transmit a radar waveform; and
receive, in response to the radar waveform, a reflection of the radar waveform from the material within the threshold distance from the UE, wherein the communication in accordance with the adaptive beam weight-based hybrid beamforming procedure is based at least in part on a distortion metric of the reflection of the radar waveform that satisfies a distortion threshold.

9. The apparatus of claim 8, wherein the one or more processors are further configured to cause the UE to:
input one or more waveform parameters of the reflection of the radar waveform into a machine learning model, wherein the one or more waveform parameters comprise at least the distortion metric; and
classify the material with a material type in accordance with an output of the machine learning model based at least in part on the one or more waveform parameters input into the machine learning model.

10. The apparatus of claim 5, wherein the one or more processors are further configured to cause the UE to:
detect a second material property for a second material within the threshold distance from the UE;
communicate in accordance with the codebook-based hybrid beamforming procedure based at least in part on the second material property for the second material; and
select a codebook from a plurality of codebooks based at least in part on the codebook-based hybrid beamforming procedure and the second material property for the second material.

11. The apparatus of claim 10, wherein the plurality of codebooks indicates different quantities of beam weights, different beam properties, different phase quantization for the beam weights, different amplitude quantization for the beam weights, or any combination thereof.

12. The apparatus of claim 1, further comprising:
one or more antennas, wherein the indication of the switch is transmitted via the one or more antennas, the one or more reference signals are received via the one or more antennas, the communication is via the one or more antennas, or any combination thereof.

13. An apparatus for wireless communications at a network entity, comprising:
one or more memories; and
one or more processors coupled with the one or more memories and configured to cause the network entity to:
obtain an indication of a switch from a codebook-based hybrid beamforming procedure to an adaptive beam weight-based hybrid beamforming procedure for a user equipment (UE);
output, in response to the indication of the switch to the adaptive beam weight-based hybrid beamforming procedure for the UE, a control signal that allocates one or more resources for one or more reference signals; and
output the one or more reference signals associated with the adaptive beam weight-based hybrid beamforming procedure for the UE via the one or more resources based at least in part on the control signal.

14. The apparatus of claim 13, wherein the one or more processors are further configured to cause the network entity to:
output assistance information that indicates a plurality of material types for classification, wherein the indication of the switch to the adaptive beam weight-based hybrid beamforming procedure for the UE is based at least in part on the plurality of material types for classification.

15. The apparatus of claim 13, wherein the one or more processors are further configured to cause the network entity to:
obtain or output one or more communications based at least in part on the one or more reference signals associated with the adaptive beam weight-based hybrid beamforming procedure for the UE.

16. The apparatus of claim 13, wherein, to output the one or more reference signals, the one or more processors are configured to cause the network entity to:
output one or more channel state information reference signals (CSI-RSs), one or more sounding reference signals (SRSs), or a combination thereof for beam weight estimation and selection.

17. The apparatus of claim 13, further comprising:
one or more antennas, wherein the indication of the switch is obtained via the one or more antennas, the control signal is outputted via the one or more antennas, the one or more reference signals are outputted via the one or more antennas, or any combination thereof.

18. A method for wireless communications at a user equipment (UE), comprising:
transmitting an indication of a switch from a codebook-based hybrid beamforming procedure to an adaptive beam weight-based hybrid beamforming procedure at the UE;
receiving one or more reference signals in response to the indication of the switch to the adaptive beam weight-based hybrid beamforming procedure; and
communicating in accordance with one or more beam weights selected based at least in part on the adaptive beam weight-based hybrid beamforming procedure and the one or more reference signals.

19. The method of claim 18, further comprising:
receiving, in response to the indication of the switch to the adaptive beam weight-based hybrid beamforming procedure, a control signal that allocates one or more resources for the one or more reference signals, wherein the one or more reference signals are received based at least in part on the control signal.

20. The method of claim 19, the receiving the one or more reference signals comprising:
receiving one or more channel state information reference signals (CSI-RSs), one or more sounding reference signals (SRSs), or a combination thereof for beam weight estimation and selection.

21. The method of claim 18, further comprising:
dynamically performing beam weight estimation based at least in part on the one or more reference signals, wherein the one or more beam weights are based at least in part on the beam weight estimation.

22. The method of claim 18, further comprising:
detecting a dielectric property, a conductivity property, or both for a material within a threshold distance from the UE; and
communicating using the adaptive beam weight-based hybrid beamforming procedure based at least in part on the detected dielectric property, the detected conductivity property, or both.

23. A method for wireless communications at a network entity, comprising:
obtaining an indication of a switch from a codebook-based hybrid beamforming procedure to an adaptive beam weight-based hybrid beamforming procedure for a user equipment (UE);
outputting, in response to the indication of the switch to the adaptive beam weight-based hybrid beamforming procedure for the UE, a control signal that allocates one or more resources for one or more reference signals; and
outputting the one or more reference signals associated with the adaptive beam weight-based hybrid beamforming procedure for the UE via the one or more resources based at least in part on the control signal.

24. The method of claim 23, further comprising:
outputting assistance information that indicates a plurality of material types for classification, wherein the indication of the switch to the adaptive beam weight-based hybrid beamforming procedure for the UE is based at least in part on the plurality of material types for classification.

25. The method of claim 23, further comprising:
obtaining or outputting one or more communications based at least in part on the one or more reference signals associated with the adaptive beam weight-based hybrid beamforming procedure for the UE.

* * * * *